United States Patent
Yamazoe et al.

(10) Patent No.: US 6,694,051 B1
(45) Date of Patent: Feb. 17, 2004

(54) IMAGE PROCESSING METHOD, IMAGE PROCESSING APPARATUS AND RECORDING MEDIUM

(75) Inventors: Manabu Yamazoe, Kawasaki (JP); Kentaro Yano, Yokohama (JP); Tetsuya Suwa, Kawasaki (JP); Okinori Tsuchiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/338,424

(22) Filed: Jun. 23, 1999

(30) Foreign Application Priority Data

| Jun. 24, 1998 | (JP) | 10-177133 |
| Jul. 21, 1998 | (JP) | 10-205085 |
| Oct. 26, 1998 | (JP) | 10-303940 |

(51) Int. Cl.⁷ .............................. G06K 9/00
(52) U.S. Cl. ............ 382/167; 382/169; 358/1.9; 358/522
(58) Field of Search .............. 382/162, 164, 382/167–169, 252, 254, 284, 271–274, 173; 358/500, 537, 515–520, 521–523, 462, 461, 1.9, 3.15, 3.13–3.14, 3.16, 2.99, 3.06; 345/589, 597, 593, 600–602, 605

(56) References Cited

U.S. PATENT DOCUMENTS

| 4,591,904 A | * | 5/1986 | Urabe et al. ............... 358/537 |
| 4,903,145 A | * | 2/1990 | Funada ...................... 358/462 |
| 4,928,167 A | * | 5/1990 | Tatsumi et al. ............. 358/523 |
| 4,984,071 A | * | 1/1991 | Yonezawa ................... 358/522 |
| 5,371,615 A | * | 12/1994 | Eschbach .................... 358/515 |
| 5,426,517 A | * | 6/1995 | Schwartz .................... 358/520 |
| 5,467,196 A | * | 11/1995 | Fukushima et al. .......... 358/3.15 |
| 5,748,773 A |   | 5/1998 | Tashiro et al. ............. 382/169 |
| 5,748,802 A | * | 5/1998 | Winkelman .................. 382/271 |
| 5,828,793 A | * | 10/1998 | Mann ........................ 382/284 |
| 6,081,343 A | * | 6/2000 | Terashita .................... 358/1.9 |
| 6,351,558 B1 | * | 2/2002 | Kuwata ...................... 382/168 |

FOREIGN PATENT DOCUMENTS

| JP | 60-057594 | 4/1985 | ........... G11C/11/34 |
| JP | 60-087594 | 5/1985 | ........... H04N/9/68 |
| JP | 09-068764 | 3/1997 | ........... G03B/27/80 |

* cited by examiner

*Primary Examiner*—Leo Boudreau
*Assistant Examiner*—Ishrat Sherali
(74) *Attorney, Agent, or Firm*—Fitzpatrick, Cella, Harper & Scinto

(57) ABSTRACT

An image processing method, an image processing system and a recording medium capable of reproducing images in colors which are close to those memorized by man including a process to create a histogram of an original image, a process to adequately locate a highlight point on the histogram by comparing peaks of the histogram and setting image processing conditions dependently on a shape of a selected peak.

10 Claims, 20 Drawing Sheets

SCENE OF SHINY BLUE SKY

IMAGE PROCESSING METHOD, IMAGE PROCESSING APPARATUS AND RECORDING MEDIUM

BACKGROUND OF THE INVENTION

1. Field of the Invention

The present invention relates to an image processing method to determine a highlight point, an image processing apparatus and a recording medium.

2. Related Background Art

In these years where personal computers had higher speeds, memory capacities were enlarged rapidly, and digital cameras, film scanners or the like widely prevail, there were increasing occasions to process images of photographic tones as digital data with personal computers. In not a few cases, however, inputs of the photographic images are accompanied by causes for image degradation such as color fog for reasons which will be described below.

For example, when a digital camera is taken as an example, rays which have wavelengths insensible by a man's eye such as infrared rays may be taken into an image photographed by a CCD camera. Though the rays are processed with an infrared cut filter or the like needless to say, the processing is not always complete and colors may be unbalanced on the image.

Though man observes an object while correcting (adapting himself to) a difference of light source colors as known well, a camera records the difference of light source colors on a film with no correction and may provide a result which looks like color fog even when the camera accurately measures and reproduces the colors.

For printing an image which is photographed with a silver salt camera (conventional camera) in a laboratory, it is general to use an automatic correcting function which analyzes a scene through an analysis of the photographed image at a stage to print the image onto the photographic paper. The applicant has proposed a method for setting a highlight point and a shadow point as a fundamental automatic correction method for digital data inputted into personal computers such as images photographed with digital cameras.

As a method for automatizing setting of a highlight point and a shadow point, Japanese Patent Application Laid-Open No. 60-87594, for example, discloses a method for preparing an accumulated frequency histogram of luminance signals which are obtained by imparting weights to color signals R, G and B of input signals and totalizing the color signals, for determining an upper limit value (a concentration at a highlight point) and a lower limit value (a concentration at a shadow point) which correspond to predetermined accumulated frequencies, for example, 1% and 99% on the accumulated frequency histogram, and for performing normalization processing using the upper limit value and the lower limit value commonly to the color signals R, G and B.

When the input color signals R, G and B are 8-bit data information (from 0 to 255 information) and converted into luminance signals in an NTSC mode, for example, the luminance signals are also 8-bit data information since $$Y \text{ (luminance)} = 0.30R + 0.59G + 0.11B.$$

That is, the histogram is used to determine frequencies of 256 luminance signals from 0 to 255. Each of the R, G and B signals is hereinafter considered in 256 8-bit gradations.

However, it is impossible in certain cases to obtain sufficiently satisfactory results even when images are corrected by using the standard concentration points which are set as described above. As a cause for such unsatisfactory results, there can be mentioned a fact that man sees an object on the basis of his memory colors.

Therefore, it is general to carry out memory color processing which provides more satisfactory results, that is, colors are reproduced so as to be matched not with calorimetric colors but with man's psychological image so that colors of blue sky, green trees and grasses and man's skin are reproduced preferably.

Though sunlight in the daytime and a tungsten lamp in a room are light sources having color temperatures which are remarkably different from each other, the man's eye can recognize a gray (or white) object under either of the light sources. This is because an observer recognizes gray (white) in his environment and automatically corrects a sensitivity with three cones of a retina on the basis of the gray (white) so as to obtain the same response to rays. In contrast, the camera is under a direct influence from the light sources and reproduces colors with a high calorimetric fidelity, thereby posing a problem that it cannot reproduce colors which are preferred by man.

When the blue sky is taken as an example in particular, a shadow portion has a color temperature which is enhanced by rays reflected from the blue sky and becomes bluish as a whole on a photograph taken outdoors in a shiny condition. When a cloud is floating in the blue sky, the man's eye automatically corrects a color of the cloud into white, whereby a difference may be produced between a color of the blue sky memorized by the man and a color of the blue sky which is calorimetrically reproduced. It has been found that it is possible, by balancing a desired cloud with white, to bring a color of the blue sky on an actual photograph close to the color of the blue sky memorized by the man.

In case of a photograph a most portion of which is occupied by a blue sky, however, it is not always possible to set an optimum highlight point from the conventional histogram which is prepared from the luminance signals having the weights since the B signal has a low weight. In other words, the histogram is unusable to correct a bluish cloud into a white cloud.

When a person or the like is photographed in a backlight condition, a main object is rather underexposed, thereby making it impossible to obtain favorable gradations. When a highlight point which is set at 99%, for example, from an accumulated frequency histogram shown in FIG. 10, for example, as described with reference to the related art, the high lightpoint is fixed nearly to a maximum luminance and correction with this histogram is almost ineffective.

Furthermore, digital input images may not be exposed adequately for a reason which will be described below.

In photographing with an ordinary camera which is not set for adequate exposure, for example, an image may be too bright or too dark due to overexposure or underexposure, thereby making details of an object illegible. Furthermore, a digital camera which photographs an image with a CCD device may pick up rays such as infrared rays which have wavelengths invisible by the man's eye. Exposure correction which is made by visual confirmation may result in an overexposure condition due to the invisible infrared rays picked up by the CCD device even if exposure is adequate for the visible rays. Though the rays are processed with an infrared cut filter or the like, the processing is not always complete and may allow a condition such as that described above.

Moreover, there are cases where adequate exposure provides conditions which look like underexposure. This is traced to a fact that man visually recognizes an object while correcting (adapting himself to) differences in luminance in his environment as known well. Even when a camera reproduces luminance accurately, the camera which records the differences in luminance with high fidelity on a recording medium such as a film or a memory card may provide a result which looks like underexposure for man who compares a photograph provided by the camera with an image memorized by himself.

To enhance qualities of digital images which have photographic tones, it is therefore necessary to correct exposed digital images dependently on their exposure conditions so that the images are close to those which are memorized by man and have adequate intermediate tones.

On an image having a photographic tone which is underexposed or overexposed, a luminance distribution is deviated toward low or high luminance, for example, as shown in FIG. 18 illustrating a luminance histogram of an image which is overexposed. Overexposure and underexposure are conventionally judged using standard values which are considered to represent luminance distributions on luminance histograms.

Japanese Patent Application Laid-Open No. 9-068764, for example, proposes a method which judges overexposure or underexposure using at least one of a standard maximum value, a standard minimum value and an average value for image correction.

An image of a person which is photographed using a flash or an image of a scene which is photographed in a backlight condition can be mentioned as an example of image which can hardly be judged for overexposure or underexposure by the conventional method.

For example, an image of a person generally has a luminance histogram which is like that of an image of a person photographed in the night shown in FIG. 21, however the method proposed by the patent mentioned above which compares the standard maximum value or the standard minimum value with a threshold value judges the image of the person as underexposure in judgement of overexposure or underexposure. Furthermore, the method judges the image of the scene in the backlight condition as overexposure in most cases.

With respect to this judgement, the patent describes a technique to use the average value which will add a luminance value to an area of the person. When an image area corresponding to the person which is an area having high luminance in the image is small as compared with an area of the image as shown in FIG. 21, that is, when a frequency distribution peak on a high luminance side represents a relatively low frequency on a histogram, however, the average value is pulled and located on a low luminance side by a frequency distribution peak on a high luminance side having a cumulative frequency which is absolutely high, whereby the method judges the image as underexposure even when the person which is a main object is exposed adequately.

In addition, the area of the person which is located on the low luminance side is made too dark when a lookup table (LUT) is used to correct a luminance value of an overexposed image at a stage to correct the image of the scene in the backlight condition.

SUMMARY OF THE INVENTION

An object of the present invention is to make it possible to process colors according to characteristics of an original image.

It is provided an image processing method comprising a plurality of highlight point detecting method, wherein the method selects a highlight point depending on characteristics of an original image and said method sets a color processing condition for the original image depending on the highlight point.

Another object of the present invention is to make it possible to favorably reproduce original images which are photographed in backlight conditions.

It is provided an image processing method comprising the steps of:

creating a histogram of an original image;

detecting whether or not the original image is a backlight scene on the basis of the histogram; and detecting a highlight point by a highlight point detecting method according to a result of the detection.

Also, an object of the present invention is to make it possible to execute an image process suited for a backlight scene by judging an image photograghed by using stroboscope.

It is provided an image processing method comprising the steps of:

inputting an image data representing an object image;

creating a histogram;

judging whether or not said object image is photographed at night with a stroboscope on the basis of the created histogram; and setting image processing conditions on the basis of a result of the judgment.

Still another object of the present invention is to make it possible to correct an image with high accuracy by setting an adequate highlight point, thereby obtaining a favorable output image.

It is provided an image processing method comprising the steps of:

creating a histogram of an input image on the basis of color components representing brightness;

detecting a highlight point of said input image on the basis of the created histogram;

determining a corrected highlight point according to the detected highlight point: and correcting colors of said input image on the basis of the detected highlight point and said corrected highlight point.

Other features, advantages and functions of the present invention as well as possible modifications thereof will be apparent from the following detailed description of the preferred embodiments of the present invention which are made with reference to the accompanying drawings.

DETAILED DESCRIPTION OF THE PREFERRED EMBODIMENTS

Now, the preferred embodiments of the present invention will be described in detail with reference to the accompanying drawings.

First Embodiment

Figure 1:
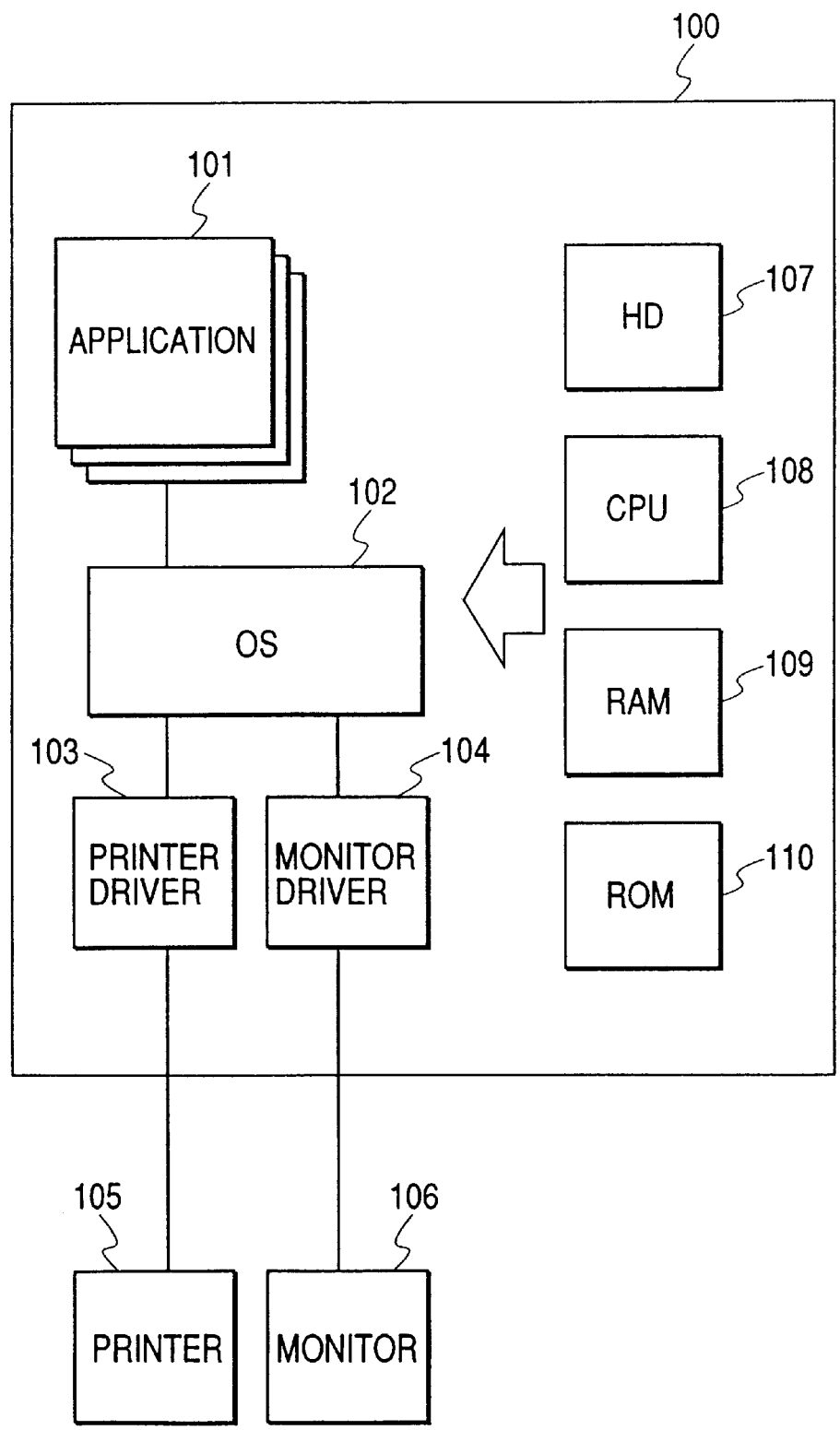
FIG. 1 is a block diagram exemplifying a configuration of the image processing system according to the present invention.

FIG. 1 schematically exemplifies a configuration of an image processing system preferred as a first embodiment of the present invention. Connected to a host computer 100 are a printer 105 which is, for example, an ink-jet printer and a monitor 106. The host computer 100 is equipped as softwares with an application software 101 for word processing, tabulation and internet browser, an OS (operating system) 102, a printer driver 103 which prepares printing data by processing a group of various kinds of tracing instructions (an image tracing instruction, a text tracing instruction, and a graphics tracing instruction) issued from the application software 101 to the OS 102 and a monitor driver 104 which displays on the monitor 106 by processing the various kinds of tracing instructions issued from the application software 101.

The host computer 100 is equipped, as hardwares which can be operated by the softwares, with a central processing unit CPU 108, a hard disk driver HD 107, a random access memory RAM 109, a read only memory ROM 110 and the like.

As an embodiment which has the configuration shown in FIG. 1, it is considered to compose the first embodiment by using Microsoft Windows 95 as the OS and installing an optional printable application software in a generally prevailing IBM AT-compatible personal computer, and connecting a monitor and a printer to the personal computer.

On the basis of an image displayed on the monitor, the host computer 100 creates output image data using text data which is classified as texts such as characters by the application software 101, graphics data which is classified as graphics such as drawings and image data which is classified as natural images. When the output image data is to be printed and outputted, the application software 101 requests a print output to the OS 102 by issuing to the OS 102 a group of tracing instructions representing an output image which has a graphics data portion composed of graphics tracing instructions and an image data portion composed of image tracing instructions. Upon reception of the output request from the application software, the OS 102 issues a group of tracing instructions to the printer driver 103 which corresponds to an output printer. The printer driver 103 creates printing data which can be printed with a printer 105 by processing the print request and the tracing instructions input from the OS 102 and transfers the printing data to the printer 105. When the printer 105 is a raster printer, the printer driver 103 performs consecutive image correction processings of the tracing instructions from the OS, rasterizes the instructions consecutively into an RGB 24-bit page memory, converts contents of the RGB 24-bit page memory into a data format, for example, CMYK data which can be printed with the printer 105 after all the tracing instruction have been rasterized and transfers the data to the printer.

Figure 2:
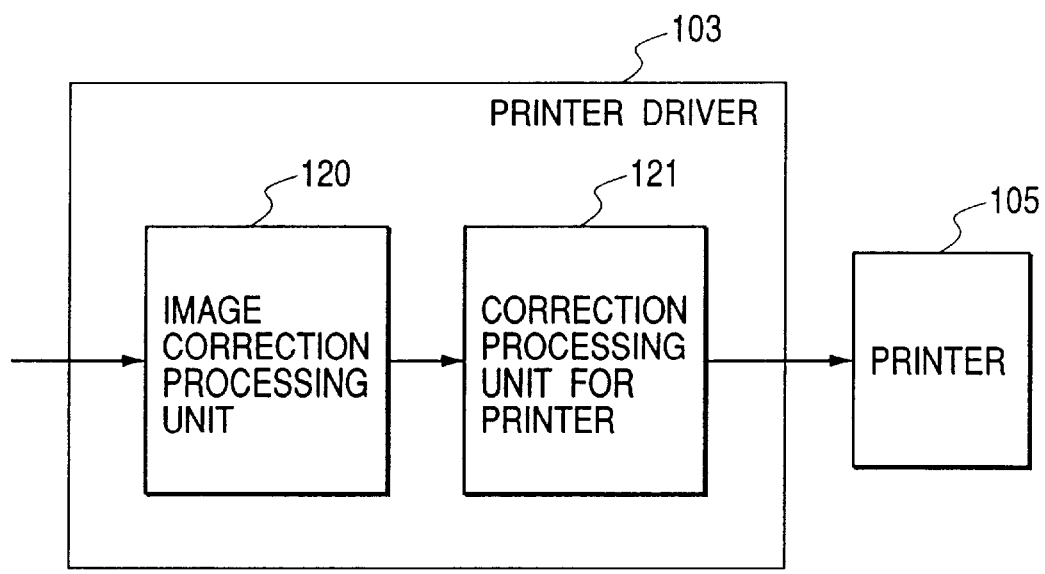
FIG. 2 is a diagram descriptive of processings performed with a printer driver.

Processings performed by the printer driver 103 will be described with reference to FIG. 2.

The printer driver 103 performs image correction processing of color data contained in the tracing instructions input from the OS 102 as described later in an image correction processing unit 120. A correction processing unit for printer 121 first rasterizes the tracing instructions with the color data which has been subjected to the image correction processing, thereby creating a raster image on the RGB 24-bit page memory. Dependently on a printer characteristic, the correction processing unit for printer 121 then creates CMYK data by performing a masking processing, a gamma correction processing, a quantization processing, etc. of each pixel in accordance with a color reproducibility of the printer, and transfers the CMYK data to the printer 105.

Figure 3:
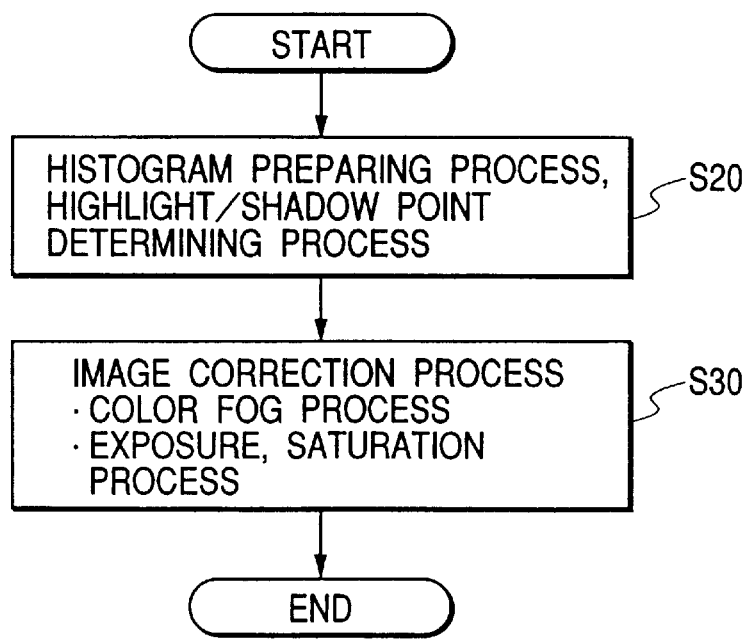
FIG. 3 is a diagram descriptive of processings performed in an image correction processing unit.

Processings performed in the image correction processing unit 120 will be described with reference to FIG. 3.

In the first embodiment, the image correction processings are performed independently for each of a plurality of images contained in an original image. The image correction processing consists of a histogram preparing process (S20 in FIG. 3) and an image correction process (S30 in FIG. 3) in accordance with a histogram.

Figure 4:
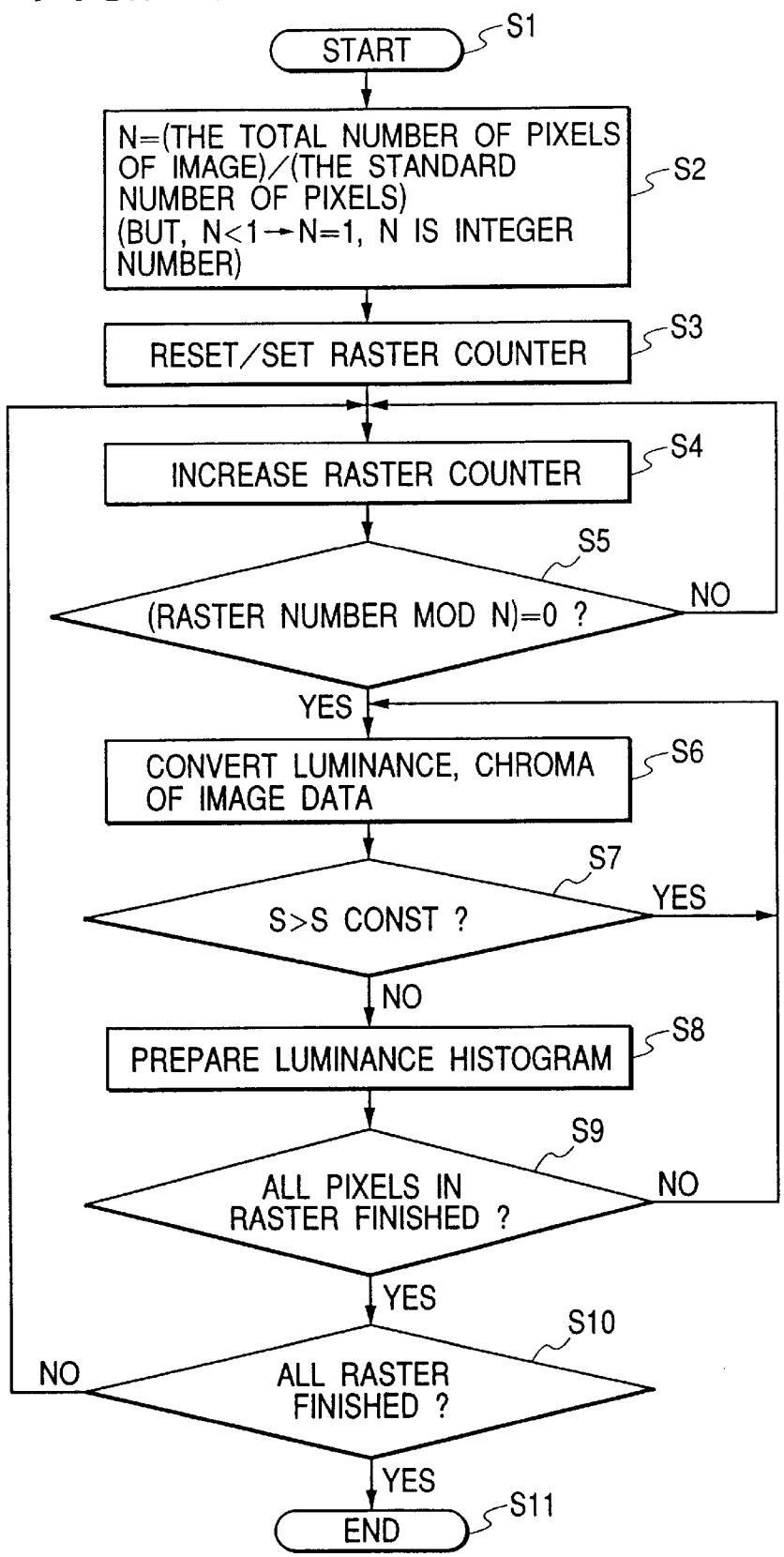
FIG. 4 is a flowchart illustrating processes to prepare a luminance histogram.

At a step S20, a histogram is prepared for an original image indicated by an image tracing instruction (step S1 through step S7 in FIG. 4). On the basis of the prepared histogram, a highlight point and a shadow point of the image are determined.

At the next step S30, an image correction processing is performed on the basis of the highlight point and the shadow point determined at S20. In the first embodiment, a color fog correction which corrects color fog on the original image and an exposure correction which corrects luminance contrast to optimize exposure of the original image are performed as image correction processings.

(Preparation of Luminance Histogram)

FIG. 4 is a flowchart illustrating processes to prepare a luminance histogram in the first embodiment.

In FIG. 4, a luminance histogram preparing routine for an original image is started at S1 and a selection ratio of pixels to be used for preparing the luminance histogram relative to pixels of the original image is determined at S2. The first embodiment is configured to prepare a luminance histogram using all pixels (a selection ratio of 100%) when data has 350,000 pixels and select (sample) pixels dependently on a number of all pixels when an input original image has 350,000 or more pixels. Speaking concretely, the first embodiment selects a pixel out of ten pixels (selection ratio of 10%) to prepare a luminance histogram when an original image having 3,500,000 pixels is input. The first embodiments determines n by the following equation:

n=int (total number of pixels on original image/standard number of pixels of 350,000)

(wherein n is an integer, n=1 when it is smaller than 1.) Subsequently, a counter which manages raster numbers is reset/set at S3 and the counter is incremented at S4.

Since the first embodiment samples pixels per raster, it processes, at the selection ratio of 10% mentioned above, pixels on a raster having a number which has a remainder of 0 when it is divided by 10 (S5).

[A raster is an object raster if it has a number mod n=0 or a non-object raster if it is otherwise.]

When a raster to be processed if the non-object raster, the image processing system returns to S4. When a raster to be processed is the object raster, the image processing system proceeds to S6, and performs luminance conversion and chroma conversion of each pixel of the raster. The first embodiment will perform the luminance conversion and the chroma conversion by formulae shown below. Not only the formulae shown below but also various formulae such as those described with reference to the related art are usable for the luminance conversion and the chroma conversion.

$Y$ (luminance)=int $(0.30R+0.59G+0.11B)$
(wherein Y is an integer)

$C1$ (chroma)=$R-Y$ $C2$ (chroma)=$B-Y$

To enhance detecting accuracies of a white location (highlight point) and a black location (shadow point), the first embodiment calculates saturation by a formula shown below and judges whether or not it is larger than a predetermined saturation value (Sconst) (S7). Data of pixels which have high saturation is not used for preparation of a luminance histogram.

Saturation $S$=sqrt $(C1^2+C2^2)$

That is, the image processing system returns to S6 when a pixel has saturation S which is larger than Sconst (S>Sconst) so that data of the pixel is not used for subsequent processings. An effect of this processing will be described by taking a concrete example. In most cases, it is originally less erroneous to judge a yellow pixel (R=G=255, B=0), for example, not as color fog between a pixel having no saturation and yellow, but as a color having a yellow shade. However, the calculation formula as mentioned above gives a luminance value of 226, thereby indicating a pixel which has extremely high luminance. Accordingly, an error may be made at a stage to detect a white location when the pixel is used for preparation of a luminance histogram.

The calculation formula mentioned above gives a saturation value of 227 for the pixel, thereby indicating a color having sufficiently high saturation. The first embodiment therefore determines the predetermined saturation (Sconst) and does not use pixels which have saturation not lower than the predetermined saturation for preparing luminance histograms.

Thereby, the first embodiment is capable of preventing detection of a white location from being erroneous due to the pixels having saturation not lower than the predetermined saturation and enhancing an accuracy to detect the white location.

After the judgement at S7 described above, the image processing system prepares a luminance histogram using pixels which satisfy the condition (S<Sconst) (S8). Since each pixel data RGB processed in the first embodiment has 8 bits (256 gradations), luminance Y is also converted to 256 depths. Accordingly, the image processing system calculates from the luminance histogram frequencies of pixels which have 256 luminance values from 0 to 255 respectively.

Furthermore, the calculation values C1 and C2 are used as data to calculate an average chroma of pixels having each luminance value at a later stage to correct color fog and the first embodiment stores the data as described below. It sets three members of a frequency, an accumulated value of C1 and an accumulated value of C2 in a format of structure arrangement variable from 0 to 255, and reflects a calculation result of each pixel to each of the members.

The image processing system judges whether or not all pixels of the object raster have been processed (S9), and when pixels which have not been processed remain in the raster, it returns to S6 and repeats the processes on and after S6. Upon completing the processings of all the pixels in the raster, the image processing system judges whether or not rasters which have not been processed remain at S10 and terminates the processings S11 when all the rasters have been processed or returns to S4 and repeats the processings described above when rasters which have not processed remain.

By tracing a luminance histogram while selecting pixels on an original image as described above, it is possible to prepare a luminance histogram with a required minimum number of pixels so as to detect a white location and a black location at enhanced accuracies at a subsequent stages.

(Determination of Highlight Point and Shadow Point)

The image processing system prepares a histogram on the basis of luminance signals, and detects a higher limit value (highlight HL1) and a lower limit value (shadow point SD) which correspond to predetermined accumulated frequencies, for example, 1% and 99%.

Furthermore, taking into consideration a case where a most portion of a photographic image area is occupied by shiny blue sky, the first embodiment creates a histogram on the basis of a simple mean value of RGB signals which have a weight of blue heavier than that of luminance and detect a highlight HL2. The simple mean is hereinafter referred to simply as lightness and a histogram composed of lightness is referred to as a lightness histogram.

Figure 5:
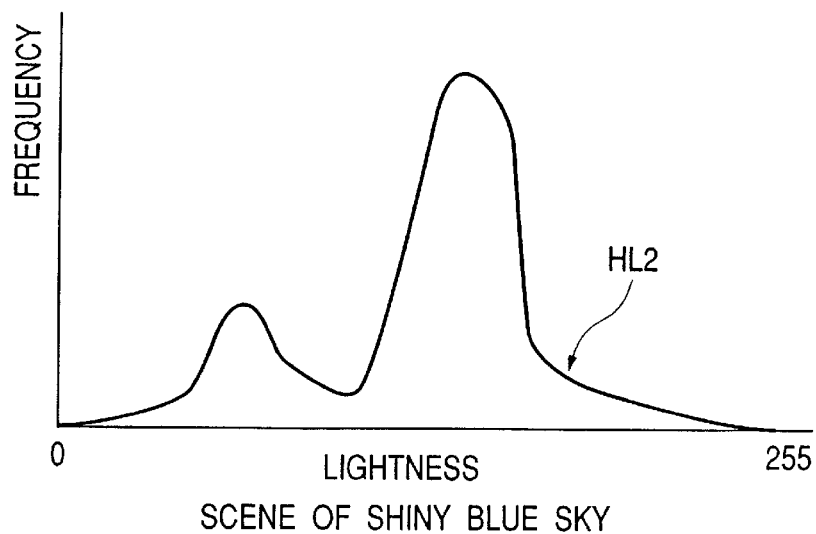
FIG. 5 is a diagram exemplifying a lightness histogram of a scene of shiny blue sky.

In the case where the most portion of the photographic image area is occupied by the shiny blue sky, a peak appears on rather a higher lightness side of a middle of a section from 0 to 255 as shown in FIG. 5. Accordingly, the image processing system detects as the HL2 a luminance corresponding to a skirt of the peak on the higher lightness side.

Since the luminance is different from the simple mean in a strict sense, the first embodiment prepares 256 tables at a stage to accumulate luminance values on the lightness histogram and stores the luminance values into the tables corresponding to lightness values, thereby incrementing luminance values.

Finally, the image processing system divides a total value of lightness by a number of stored luminance values, thereby calculating a mean value.

Successively, the image processing system detects a first peak from the higher lightness side and adopts the luminance value stored in the table as HL2 for lightness corresponding to a skirt of the first peak. The first peak is a lightness area which is determined after a smoothing processing of the histogram by calculating inclinations of tangents at different lightnesses on the histogram from the higher lightness side until an inclination of a tangent has a value not smaller than a predetermined value.

The first embodiment detects highlight points from the two histographs that is luminance histogram and lightness histogram, and calculates a luminance value at each of the highlight points as described above.

Then, the image processing system determines a highlight point suited for the original image by comparing the two highlight points (HL1 and HL2).

When the comparison of the two highlight points provides a result of HL2<HL1, the image processing system adopts HL2 as a highlight point. However, it is necessary to adopt a certain limitation such as HL2>150. Since a histogram occupied by a blue sky portion is usually located on rather a higher signal side from a middle of a histogram of a scene of blue sky (data to be experimentally obtained), the threshold value is preliminarily set so that HL2 is not set at a location on a lower signal side.

When the condition mentioned above is not satisfied, in contrast, HL1 is adopted as a highlight point.

In addition, a shadow point determined on the luminance histogram is adopted as a shadow point.

The first embodiment which modifies highlight points dependently on characteristics of scenes is capable of providing results more favorable than those obtained through the image correction by the conventional setting method. Speaking concretely, the first embodiment permits setting as a highlight point a point outside a blue sky on an image on which a shiny blue sky is contained in a scene. When a cloud is floating in the blue sky, for example, the first embodiment permits, like the man's eye, setting the cloud (indicated by white having lightness higher than that of the blue sky) as a highlight point. Accordingly, the first embodiment is capable of reproducing a color of the blue sky which is close to the color memorized by man.

(Correction of Color Fog)

Successively to the determination of the white location and the black location in the Y, C1, C2 color space of the original image, the image processing system performs correction of color fog.

When the original image is free from color fog and an ideal image, no saturation is R=G=B, and calculation values of chroma at the white location and the black location are "C1w=C2w=C1k=C2k=0". When the original image is affected by color fog, however, a straight line (color solid axis) which connects (Yw, C1w and C2w) and (Yk, C1k and C2k) respectively is inclined in proportion to a degree of the color fog in a direction of a color shade of the color fog. The color fog can be corrected by converting so that the color solid axis is coincident with the Y axis. The correction can be made by rotating and shifting the color solid in parallel or converting a coordinates system.

In the first embodiment, a color solid of the original image is first rotated taking a lowermost luminance point (a lower end) of a color solid axis as a center of rotation and taking the color solid axis as an axis of rotation in parallel to the Y axis. Then, a coordinates system is converted so that the lowermost luminance point is located at an origin of a (Y', C1', C2') space.

Figure 6A:
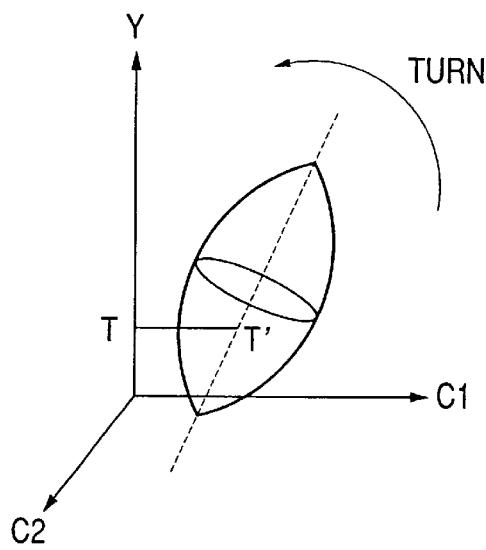
FIGS. 6A and 6B are diagrams descriptive the correction of color fog.
Figure 6B:
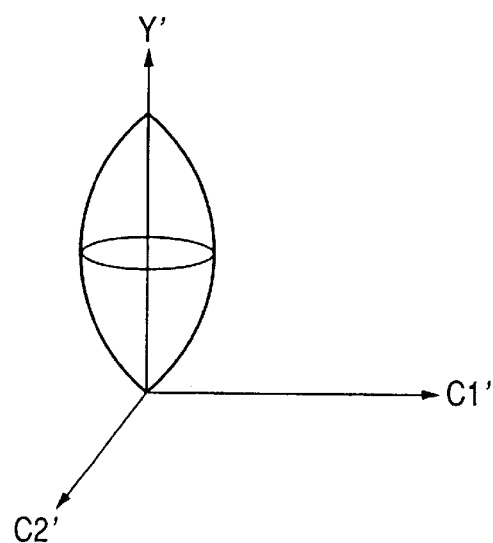

FIG. 6B shows a result of a color fog correction which is effected on a color solid shown in FIG. 6A.

The processings described above convert the color solid so that its lowermost luminance point is located at the origin and the color solid axis is coincident with the Y axis.

A technique to determine a matrix for rotating a solid at a desired angle in a three dimensional space in which an axis of rotation and an angle of rotation are predetermined is known and will not be described in particular.

Color fog can be corrected by converting the pixels of the original image into the luminance and color chroma data (Y, C1, C2), and rotating and shifting in parallel (Y', C1', C2') in the three dimensional space as described above.

(Correction of Exposure and Saturation)

Though a deviation in color shade of the original image can be corrected by correcting color fog as described above, the image processing system performs correction of exposure and saturation to further enhance an image level.

The first embodiment corrects exposure by simply judging whether an image is overexposed or underexposed and performing γ correction according to a judgement result.

The exposure correction is performed with a primary LUT which converts input luminance values of 0 through 255 into output luminance value of 0 through 255. The LUT used in the first embodiment is capable of expressing two straight lines which connect three points of a luminance value Yk at the black location (shadow point), a luminance value Yw at the white location (white point) and a luminance value T' at an inflection point located between the white location and the black location (see FIG. 6A).

The first embodiment converts the luminance value Yk at the black location and the luminance value Yw at the white location into 10 and 245 respectively. Furthermore, it defines and converts the luminance value T' at the inflection point as described below. Representing a luminance value which is a shortest distance between the color solid and the Y axis (luminance axis) before the correction of color fog by T, the luminance value T' at the inflection point is defined as a difference between the luminance value T and a lowermost luminance value of the color solid of the original image. The luminance value at the inflection point is converted into the luminance value T.

Figure 7:
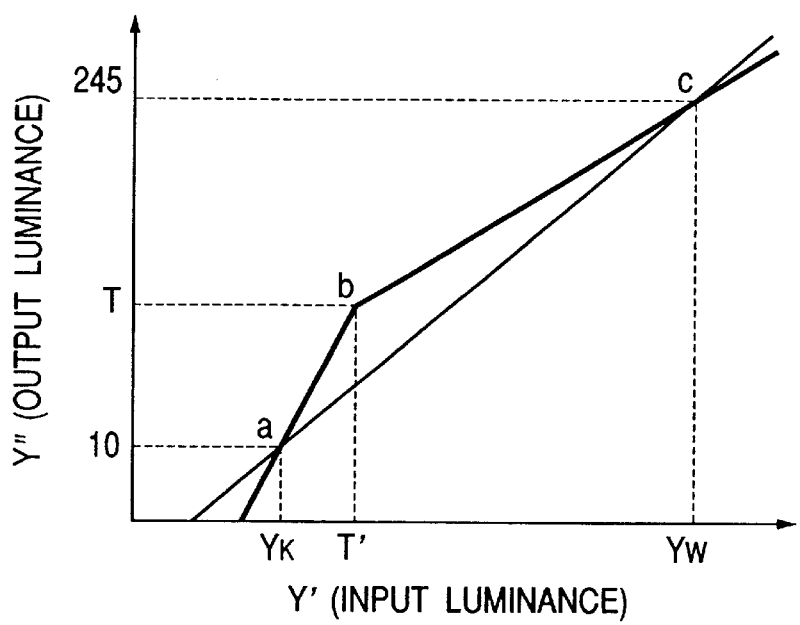
FIG. 7 is a diagram descriptive of an LUT for exposure correction.

That is, the luminance value Yk at the black location is converted into 10 (point a), the luminance value T' at the inflection point is converted into T (point b) and the luminance value Tw at the white location is converted into 245 (point c) respectively as shown in FIG. 7. Other luminance values of the original image are converted along a straight line which connects the point A to the point B and further to the point C as indicated by a thick line shown in FIG. 7.

Furthermore, the saturation correction can be made as described below. Color shades C1 and C2 of pixels of the original image are expressed as follows:

$$C1''=n*C1'$$

$$C2''=n*C2' \text{ (wherein n is a saturation coefficient)}$$

Saturation can easily be corrected by adjusting the saturation coefficient n.

The first embodiment completes various kinds of corrections as described above. Since each of the pixels of the original image is in a condition where the color signal data (R, G, B) into the color space data (R', G', B') at this time, the pixel is reversely converted into the color signal data according to the following formulae:

$$R'=Y''+C''$$

$$G'=Y''-(0.3/0.59)*C1''-(0.11/0.59)*C2''$$

$$B'=Y''+C2''$$

In addition, the pixels may be sampled not per raster but per column.

Second Embodiment

Description will be made of a method to determine a highlight point which is different from that described with reference to the first embodiment.

Figure 8:
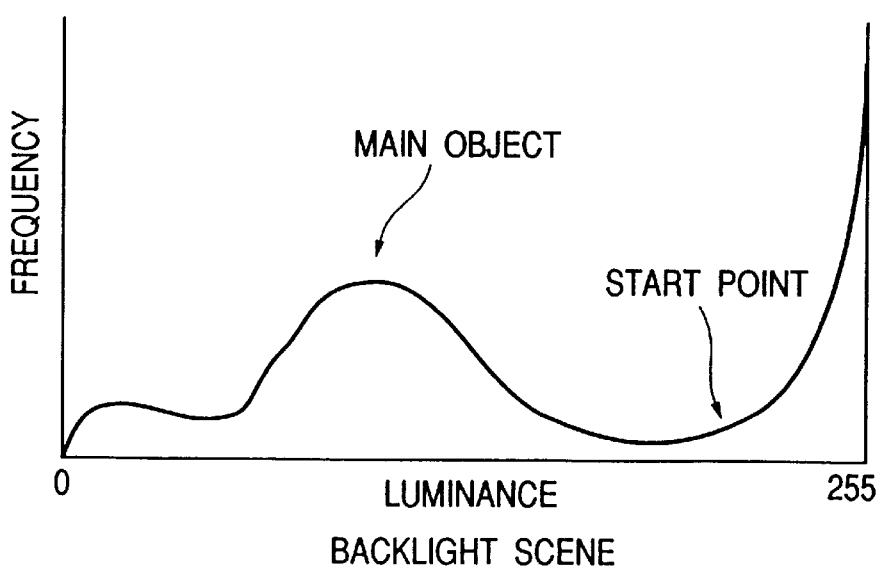
FIG. 8 is a diagram exemplifying a luminance histogram of a backlight scene.
Figure 9:
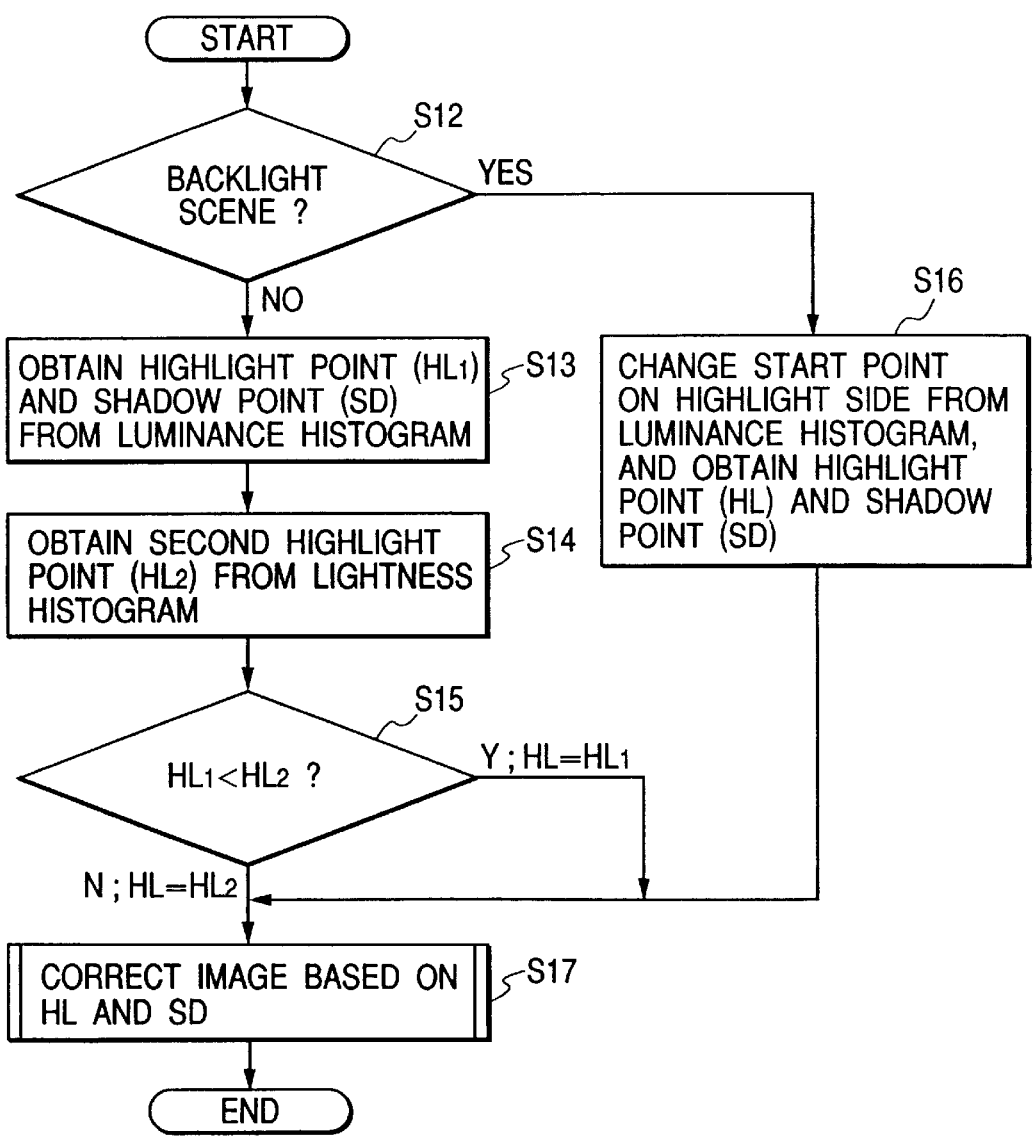
FIG. 9 is a flowchart illustrating processes for image correction in a third embodiment.
Figure 10:
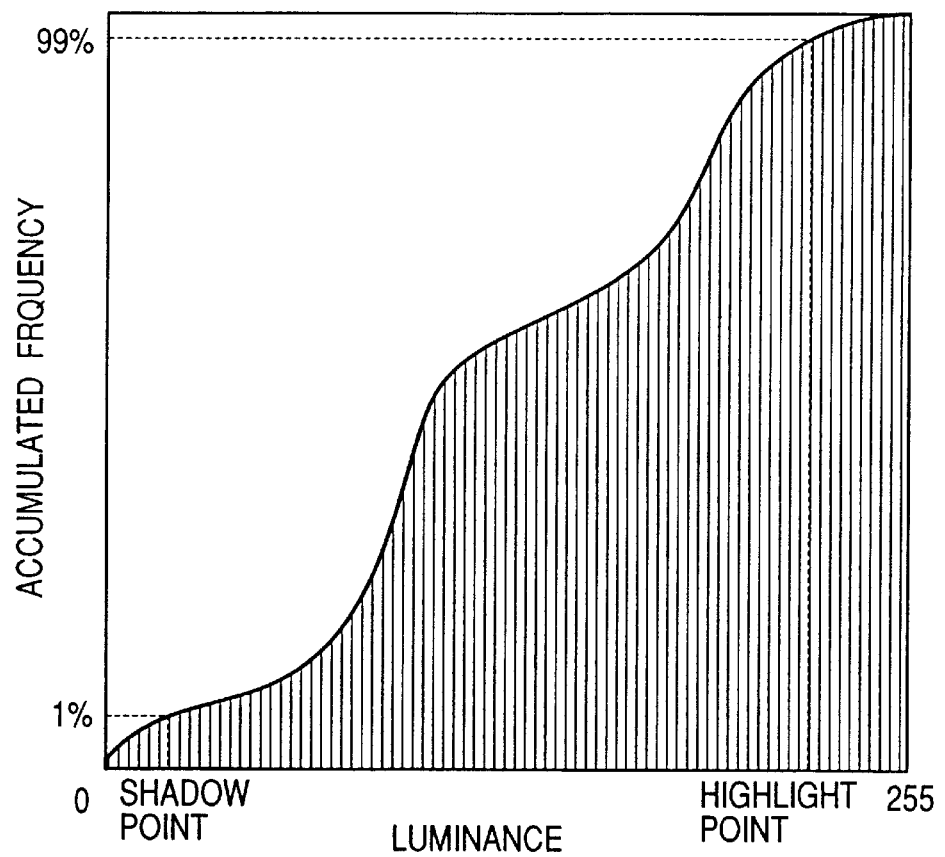
FIG. 10 is a diagram descriptive of a method for determining a highlight point/shadow point from a conventional luminance histogram.

When a photographic image contains a portion which is in a backlight condition or a scene irradiated with a light source such as a fluorescent lamp as shown in FIG. 8, a main object is rather underexposed and a luminance value having the predetermined accumulated frequency on the histogram set as the highlight point is fixed nearly to 255, whereby the image is scarcely corrected by the correcting processing on the basis of the highlight point. It is therefore necessary in such a case to set a highlight point once again. Such an image will hereinafter be referred to as "a backlight scene".

Though a luminance histogram or a lightness histogram can be used to determine a highlight point in the second embodiment, it is rather preferable to use a lightness histogram which indicates a tendency of the underexposure more remarkably.

The method for determining a highlight point in the backlight scene will be described concretely below.

When the histogram has a shape such as that shown in FIG. 8, a highlight point is set at a location at a definite ratio from a skirt of distribution occupied by a backlight portion as shown in FIG. 8. The skirt of distribution occupied by the backlight portion can be detected by a method similar to that used to detect the skirt of the lightness histogram in the first embodiment. That is, the skirt can be detected on the basis of a variation of an inclination of a tangent on the histogram.

Alternately, detection of a highlight point is started not from 255 but from a predetermined value, for example, of 240 only when the image processing system judges a backlight scene.

The image processing system will judge a backlight scene as described below.

The image processing system judges a backlight scene when a relation between a total number SUM1 of frequencies of 225 to 240 and a total number SUM2 of frequencies of 241 to 255 is:

$$2 \times SUM1 < SUM2$$

When the original image is judged as a backlight scene, a highlight point is located at a point at 1% from a start point (for example 240) as shown in FIG. 8. Since a range for addition and coefficients are selected empirically, these factors are to be determined experimentally.

An original image which is preliminarily judged as a backlight scene as described above can be corrected more preferably by modifying a setting of a highlight point.

When an original image is judged as a backlight scene, an image of a higher quality can be obtained by determining a highlight point as described above and controlling the exposure correction in the first embodiment as described below.

When an original image is judged as a backlight scene, a highlight point is set lower than that on an ordinary scene. Accordingly, a ratio of pixels on the backlight scene which have luminance higher than that at a highlight point on the original image is higher than that on the ordinary scene.

Therefore, exposure correction of the backlight scene similar to that in the first embodiment may converts too many pixels of the original image into white, thereby lowering a quality of an output image. In case of the backlight scene, a luminance value which is to be used to convert a highlight point is therefore set, for example, at 220 which is lower than that for the ordinary scene. Backlight scenes can be reproduced favorably by modifying image correction conditions dependently on kinds of the scenes as described above.

Luminance values on the backlight scenes after conversion may be set automatically dependently on ratios of pixels having luminance higher than those at highlight points on original images.

Third Embodiment

Description will be made of a third embodiment wherein a highlight point is set by processings which are collected from those in the first embodiment and the second embodiment.

The third embodiment is capable of performing favorable correction of a backlight scene and reproducing scene of a shiny blue sky in a color which is close to that memorized by man.

At a step S12 first, the image processing system judges whether or not an original image is a backlight scene on the basis of a luminance histogram of the original image by the method described with reference to the second embodiment.

When the original image is judged as a backlight scene, the image processing system determines a highlight point HL and a shadow point SD by the highlight point determining method described with reference to the first embodiment (steps, S13, S14 and S15).

When the image processing system judges that the original image is not a backlight scene at the step S12, in contrast, it determines a highlight point HL and a shadow point SD by the highlight point determining method described with reference to the second embodiment.

At a step S17, the image processing system performs the image correcting processings which are described with reference to the first embodiment on the basis of the highlight point HL and the shadow point SD.

Each of the embodiments described above makes it possible to obtain more favorable image correction results by modifying highlight points used as bases of image correction dependently on characteristics of scenes as described above.

The first embodiment and the third embodiment are capable of reproducing a shiny blue sky contained in scenes in a color which is close to that memorized by man.

Furthermore, the second embodiment and the third embodiment are capable of more preferably correcting images containing backlight scenes and fluorescent room lamps.

Fourth Embodiment

Though the color fog correction is performed first and the so-called contrast adjustment is subsequently carried out to correct overexposure or underexposure in the first through third embodiments described above, these processes may be carried out in an optional order. Furthermore, a variety of methods are usable to determine highlight point/shadow point and correct images since the method and algorithm described above are not limitative.

Though the simple mean is used to prepare the lightness histogram in the first embodiment described above, a histogram may be prepared on the basis of color components among which a blue component has a weight rather heavier than that in the luminance signals.

Though the first embodiment described above automatically selects the highlight point on the basis of the luminance histogram or highlight point on the basis of the lightness histogram, either of the highlight points may be selected according to a user's manual instruction.

For example, the image processing system may be configured to select the highlight point on the basis of the lightness histogram when a user selects a blue sky mode for a blue sky on a user interface of the printer driver. When the blue sky mode is not selected, the image processing system automatically selects a highlight point as in the first embodiment.

Furthermore, it is possible to prepare not only the histogram to cope with the blue sky, but also methods which create color components indicating a plurality of lightnesses corresponding to other scenes so that the image processing system automatically selects a histogram corresponding to any of the color components dependently on a color distribution on an original image as in the first embodiment or a histogram according to a user's instruction.

Fifth Embodiment

Figure 11:
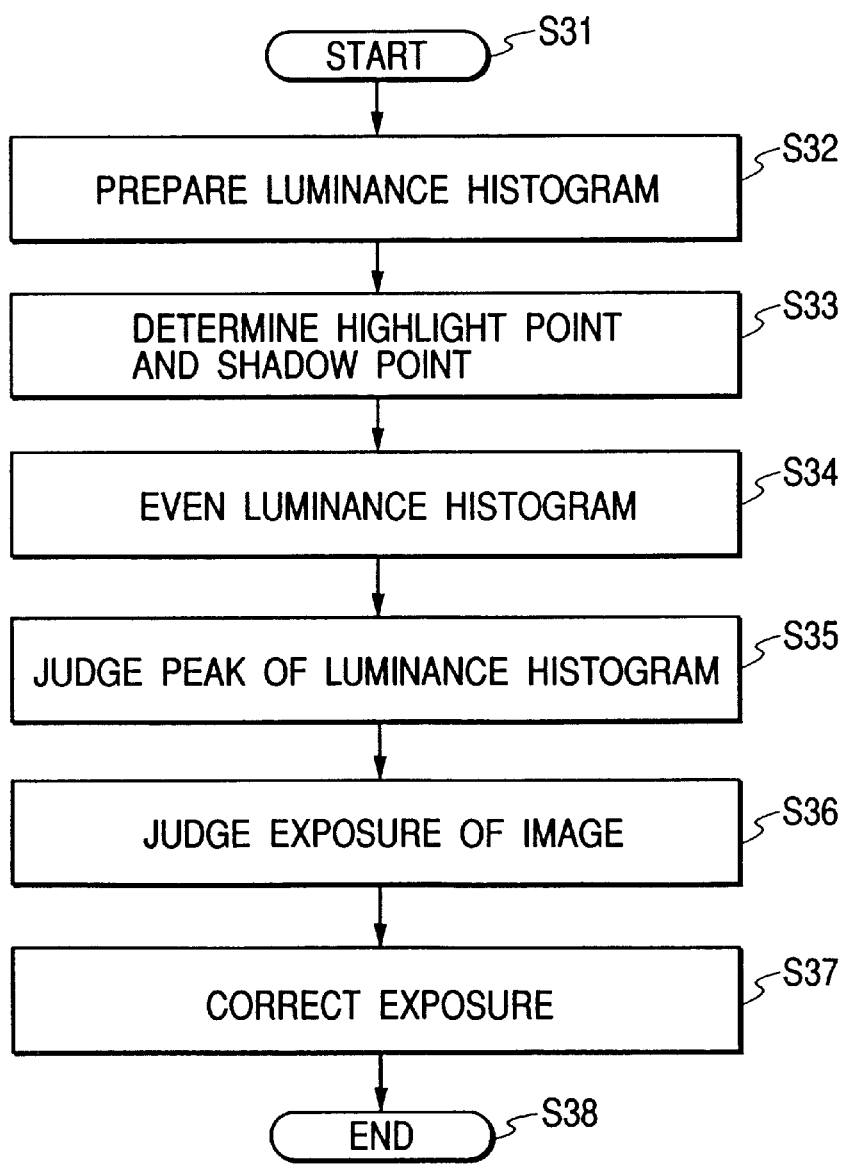
FIG. 11 is a flowchart descriptive of image processings performed in the image correction processing unit in a fifth embodiment.

Now, exposure correcting processings which are performed in the image correction processing unit 120 shown in FIG. 2 will be described with reference to the flowchart shown in FIG. 11.

The exposure correcting processings are performed on an image data portion of the same image indicated by the image tracing instructions. When an output image contains a graphics image and another image, for example, the image processing system extracts an image portion of the same image and performs exposure correcting processings.

At S32, the image processing system creates luminance data for each pixel of the image from RGB image data which composes each pixel value, consecutively counts a frequency on the basis of a luminance value and prepares a luminance histogram.

It is not always necessary to check luminance values of all the pixels composing the image to prepare the luminance histogram and it is possible to adequately select pixels to be checked for their luminance values.

At S33, the image processing system determines a highlight point (HL) and a shadow point (SD) on the image on the basis of a prepared luminance histogram.

A method to determine the highlight point and the shadow point will be described below detailedly and concretely.

Japanese Patent Application Laid-Open No. 60-57594, for example, proposes a method to prepare an accumulated frequency histogram of luminance signals by imparting weights to color signals R, G and B of input signals and adding the color signals, and select an upper limit value and a lower point value corresponding to predetermined accumulated frequencies, for example 1% and 99% respectively, on the accumulated frequency histogram as a highlight point and a shadow point.

When image data which has 350,000 pixels, for example, is to be processed in the fifth embodiment, 3500 corresponding to 1% of the pixels is set as a threshold value, and points which are located toward a center from ends having luminance values of 0 and 255 and have an accumulated frequency value equal to the threshold value are determined as a shadow point and a highlight point respectively.

Speaking concretely, an accumulated frequency is calculated as $n0+n1+ \ldots$ taking a frequency of a pixel having luminance Yn as n and a luminance value (Yk) at which the accumulated frequency exceeds 3500 is determined as a luminance value (Yk) at the shadow point.

Though the accumulated frequency is calculated from locations which have luminance values of 10 and 245 in the fifth embodiment, accumulated frequency may be calculated from locations having predetermined offsets, for example, from a luminance value of 1 and a luminance value of 254.

At S34, the image processing system smooths the prepared luminance histogram, for example, by calculating a moving average and performs processing to enhance an accuracy of a judgment described later.

Using the luminance histogram prepared above, the image processing system judges exposure of the image and corrects the exposure according to a judgment result.

First, the image processing system performs an exposure judging processing described later and detects peaks of the luminance histogram which is required for an exposure correcting processing (S35).

(Detection of Peak)

Figure 16:
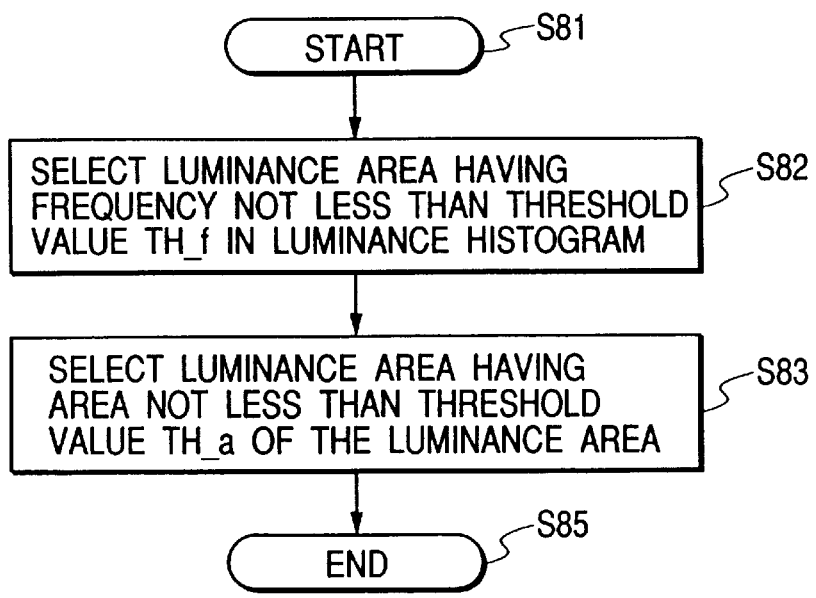
FIG. 16 is a flowchart of processes to detect a peak on a luminance histogram in the fifth embodiment.

A method for detecting peaks on the luminance histogram (S35) will be described with reference to a flowchart shown in FIG. 16 illustrating processes for detecting peaks on a luminance histogram.

Figure 22:
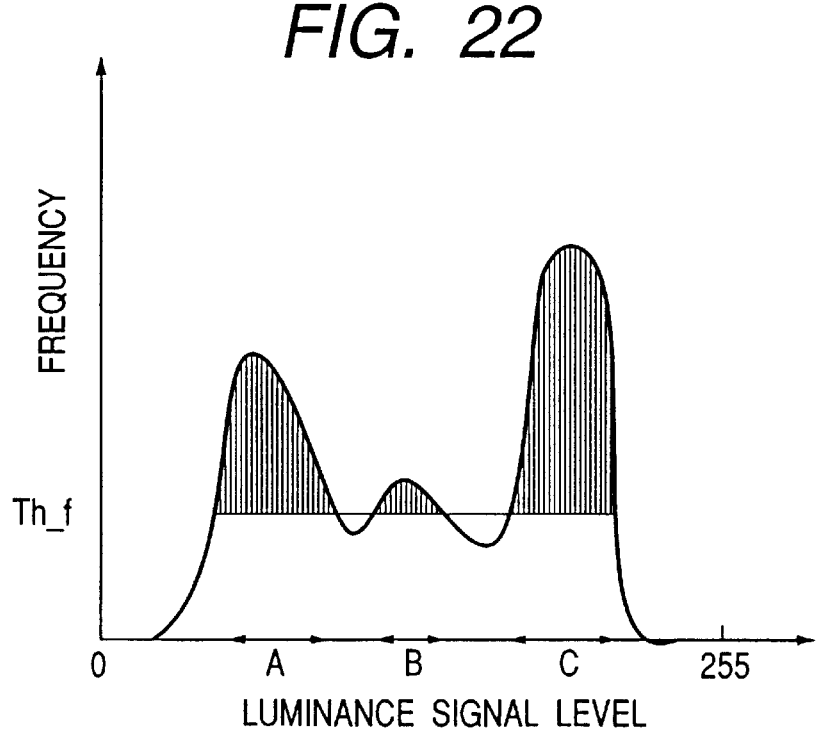
FIG. 22 is a diagram showing peaks on a luminance histogram which are detected by peak detecting processing of the luminance histogram.

At S82 first, the image processing system sets a threshold value Th_f of frequency on the prepared luminance histogram and regards a luminance area having frequencies exceeding the threshold value as an area within which peaks of the histogram exist (A, B and C in FIG. 22).

Usable as the threshold value Th_f is, for example:

(A number of all pixels composing luminance histogram)/($HL-SD+1$)

In the fifth embodiment, a labelling table (one-dimensional arrangement) 256 wide is prepared and the table is labelled each time a frequency of the luminance histogram exceeds the threshold value Th_f for example, a label No. 1 is attached to a location corresponding to a first peak area as counted from a lower luminance side and similar labels are attached to locations of the table corresponding to peaks while progressively moving luminance values on a higher side, thereby detecting peaks.

(if histogram [j]>Th_f, then label_table [j]=1)

Speaking concretely with reference to FIG. 22, for example, labels Nos. 1, 2 and 3 are attached to peak areas A, B and C respectively, whereby rows of numerics having lengths corresponding to widths of the areas are written into the prepared table.

(label_table [ ]={0,0,0,1,1,1,1,1,0,0,0,2,2,0,0,0,3,3,3 . . . })

Figure 23:
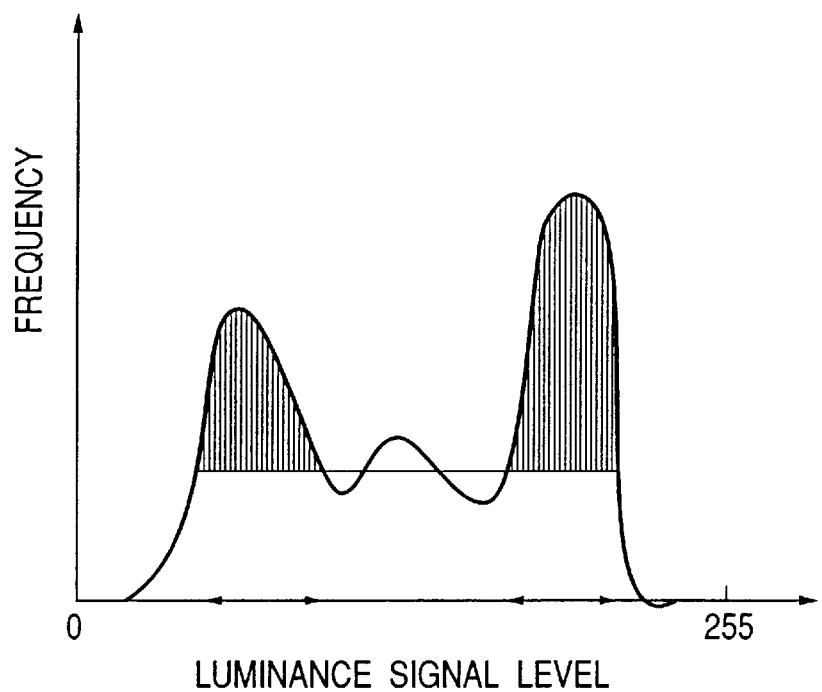
FIG. 23 is a diagram showing a low peak which is removed by the peak detecting processing of the luminance histogram by taking cumulative frequency of a peak area into consideration.

When a luminance distribution is like that on the luminance histogram shown in FIG. 22, however, this peak detecting method detects an area which is not so important, that is, a low peak (peak B in FIG. 22) which does not represent characteristics of an image as a whole. At S83 which is a step of a process to detect peaks on the luminance histogram, the fifth embodiment simultaneously counts accumulated frequencies of regions reaching the threshold value, that is, areas of the image occupied by the regions at a stage to compare each class mark with the threshold value Th_f. Regions which have accumulated frequencies not exceeding a threshold value Th_a are removed from regions within which peaks exist (FIG. 23).

The threshold value Th_a which is used to remove low peaks which do not represent characteristics of an image as a whole is set dependently on characteristics of images. In the fifth embodiments, the threshold value Th_a has a value twice as large as that of the threshold value Th_f.

The fifth embodiment uses an equivalent table to remove peaks. An equivalent table (equiv_table [j]=j) which preliminarily accommodates certain labels, for example, a label value of 3 at a location corresponding to 3 and a label value of 4 at a location corresponding to 4 is prepared. Then, a value of the table corresponding to a label value to be removed from the table is set at 0. On the histogram shown in FIG. 22 from which B (label No. 2) is to be removed, for example, equiv_table [2] is set at 0. Finally, label values on the labelling table can be rewritten using the equivalent table. For example, values from 0 to 255 are rewritten as tmp=label_table [j], label_table [j]=equiv_table [tmp] using a group of tables.

Furthermore, the method which uses the threshold value Th_f for luminance values and the threshold value Th_a for accumulated frequencies of the luminance values may determine no peak on a luminance histogram dependently on a shape of the histogram. Even in such a case, the image processing system is always capable of detecting peaks on the luminance histogram by repeating peak detection using, for example, Th_f'=0.5*Th_f in place of Th_f, thereby progressively lowering a threshold value.

Using luminance values at ends of the determined peak areas as characteristic points Pk of the luminance histogram (k=1, 2, 3, . . . max), the image processing system performs processings which are described below.

(Exposure Judging Processing)

The image processing system performs an exposure judging processing S36 using luminance values Pk at both ends of each of the plurality of peaks determined at S35.

By the exposure judging processing, the image processing system is capable of classifying exposure conditions of images into overexposure 48, underexposure 50, standard exposure 49 and other exposure conditions 51 such as backlight.

Figure 12:
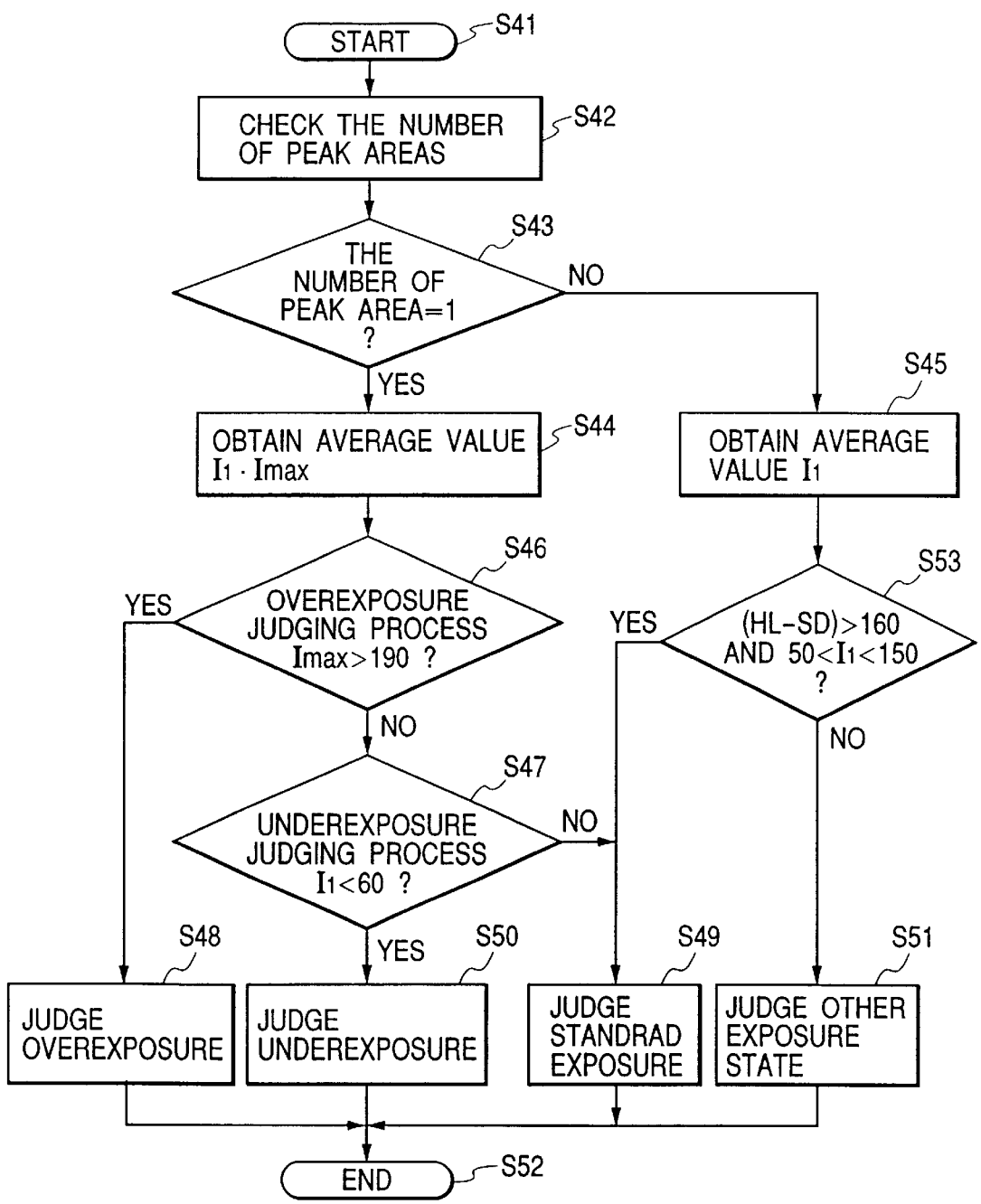
FIG. 12 is a flowchart descriptive of image processings performed in an exposure judging processing unit in the fifth embodiment.

The exposure judging processing will be described below with reference to a flowchart shown in FIG. 12 illustrating image processing performed in the exposure judging processing unit.

First, the image processing system counts a number of detected peak areas (S42). It judges whether or not the number is 1 (S43).

Judgement of Other Exposure Conditions Such as Backlight

When the image processing system judges at S43 that two or more peaks have been detected, an image may be a backlight scene or an image of a person photographed at night with a strobe. Accordingly, the image may be in the other exposure conditions such as backlight when the image processing system judges at S43 that a number of peak areas is not 1.

When a bright sky or a black dress is contained in an image in the standard exposure condition which has a luminance histogram expressing an intermediate tone abundantly as a whole, peaks may be formed at high luminance locations and low luminance locations, thereby producing a plurality of peaks on the same luminance histogram. It is not preferable to perform exposure correction for the image in the standard exposure condition expressing an intermediate tone abundantly in the same manner as the backlight scene image or the image of the person photographed at night with a strobe.

Accordingly, the image processing system carries out the following processings, detects an image in the standard exposure condition and controls so as to perform exposure correction suited to the image in the standard exposure condition.

At S45, the image processing system calculates an average value I1 of P1 and P2. Assuming that the average value I1 is a peak value in a peak area which is defined by P1 and P2, the image processing system performs the following processings.

In the fifth embodiment, the image processing system judges whether or not an image is in the standard exposure condition using the highlight point (HL) and shadow point (SD) determined at S33 as well as the average value I1 determined at S45. This judgement prevents an image in the standard exposure condition which has a plurality of peak areas from being erroneously judged as an image in a backlight condition.

Speaking concretely, a sufficient width, for example not less than 160 in the fifth embodiment, is reserved between the shadow point (SD) and the highlight point (HL), and the peak area defined by P1 and P2 is located nearly at a center of a region having a luminance region of 0 to 255. The fifth embodiment, for example, judges an image as an image in the standard exposure condition when the average value I1 satisfies a condition of 50<I1<150.

Figure 19:
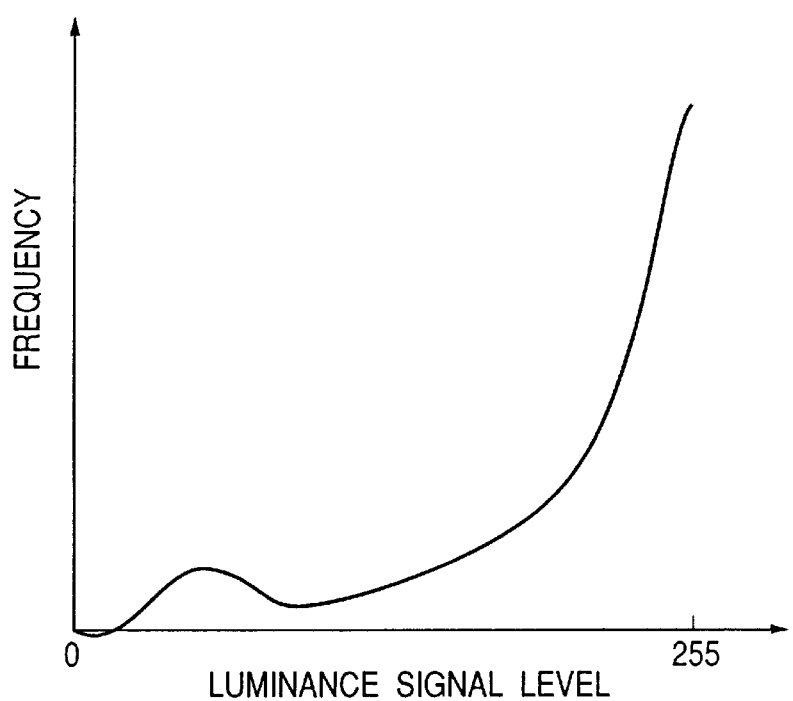
FIG. 19 is a luminance histogram of a backlight image.
Figure 21:
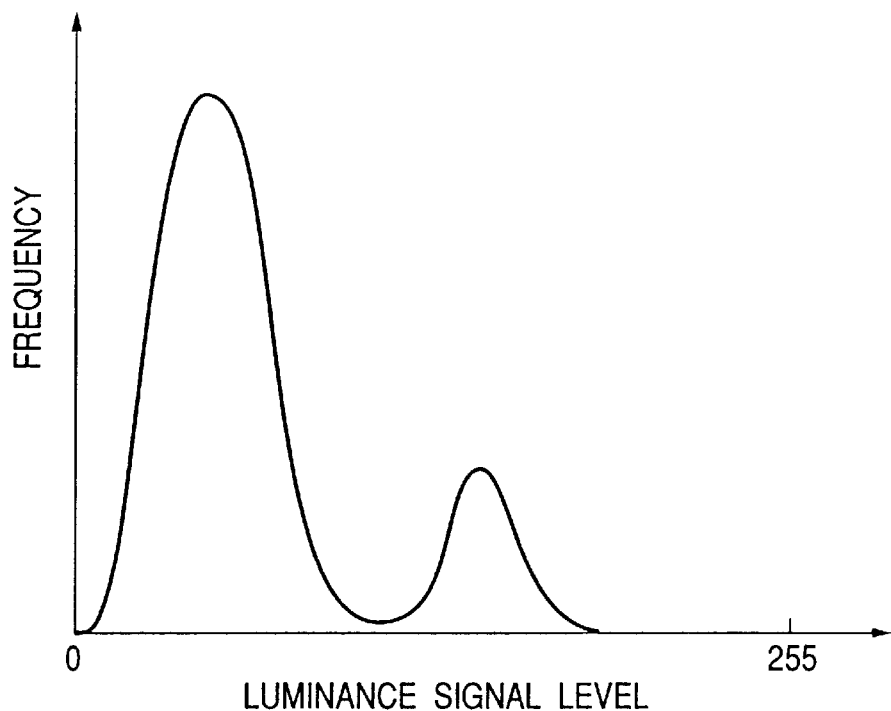
FIG. 21 is a luminance histogram of an image of a person which is photographed by using a strobe at night.

An image which does not satisfy the condition is judged as an image in the other exposure condition, varying exposure condition due to area in the image, for example, a backlight scene which is photographed without using a strobe and has a luminance distribution like that on the luminance histogram of backlight scene shown in FIG. 19 or an image of a person which is photographed at night using a strobe and has a luminance distribution like that on the luminance histogram shown in FIG. 21 (S51).

Judgement of Underexposure or Overexposure

When the image processing system judges that a peak area has been detected at S43, an image may be a backlight scene or an image of a person which is photographed at night using a strobe.

The image processing system judges at S46 whether or not an input image is overexposed and successively judges at S47 whether or not the input image is underexpose.

The image processing system first calculates at S44 an average value I1 on the basis of P1 and P2, and determines an average value Imax on the basis of $Pmax_{-1}$ and Pmax.

For example, when an object is irradiated directly with forward sunlight in a shiny condition, a photographed image is highly luminant, bright and overexposed as a whole. On a luminance histogram of such an image, a luminance distribution is deviated to a higher luminance side as a whole, for example, as seen from a luminance histogram shown in FIG. 18.

In order to simplify judgement of an overexposure image, the fifth embodiment regards an input image as an overexposed image when the average value I1 and a threshold value Th_over of a luminance value is in a relation of I1>Th_over (S48). The fifth embodiment adopts 190, for example, as the threshold value Th_over.

The fifth embodiment performs at step S50 underexposure judgment for an input image which is not judged as overexposure.

Figure 20:
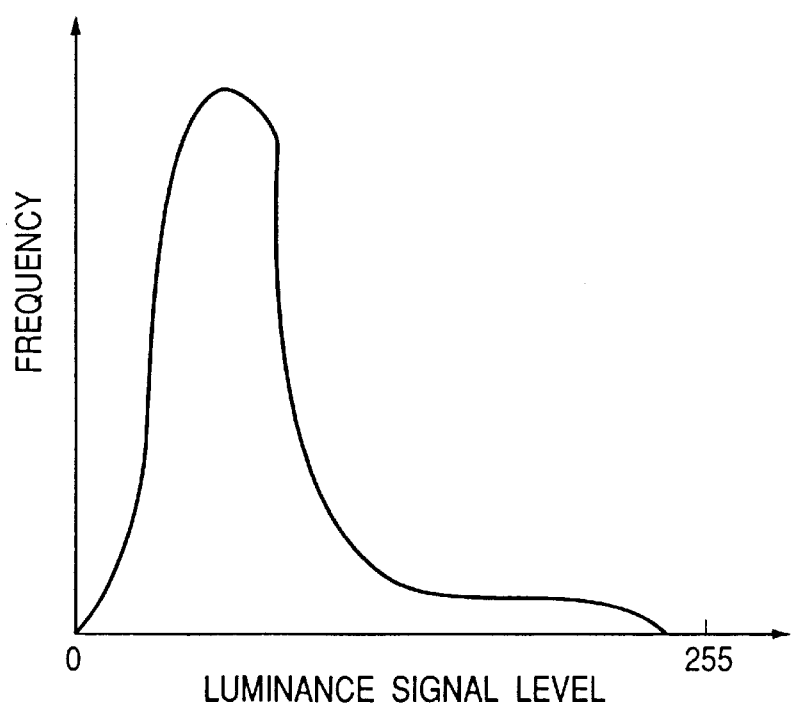
FIG. 20 is a luminance histogram of a shadow image photographed without using any strobe.

Even in a cloudy, shiny or forward illumination condition, a photographed image is dark and underexposed as a whole not only when an object is located in a wood or a shadowed space but also when a blue sky which has high luminance and occupies a most portion of a background actuates an AE (automatic exposure) controller in photographing an object with an automatic photographing function of a camera. On a luminance histogram of such an image, a luminance distribution is deviated to a lower luminance side as a whole as that on a luminance histogram of an underexposure image shown in FIG. 17 or that on a luminance histogram of an image of a shadowed object photographed without using a strobe which is shown in FIG. 20.

In order to simplify judgement of an underexposure image, the fifth embodiment judges an image as an underexposure image when Imax and a threshold value Th_under of a luminance value is in a relation of Imax<Th_under (S50). The fifth embodiment adopts 60, for example, as the threshold value Th_under.

The underexposure judgement and the overexposure judgement may be carried out in a reverse order.

Standard Exposure

In the fifth embodiment, an image which is not judged as an underexposure image at S47 and an image which is judged as a standard exposure image at S53 are judged as standard exposure images (S49).

(Exposure Correcting Processing)

The image processing system selects or creates an LUT which is suited to a judging processing result of S36 obtained with the processings shown in FIG. 12 and performs exposure correction dependently on an exposure condition of an image using the LUT (S37).

The fifth embodiment converts the input luminance values of 0 through 255 into output luminance values 0 through 255 using the one-dimensional LUT.

Figure 13:
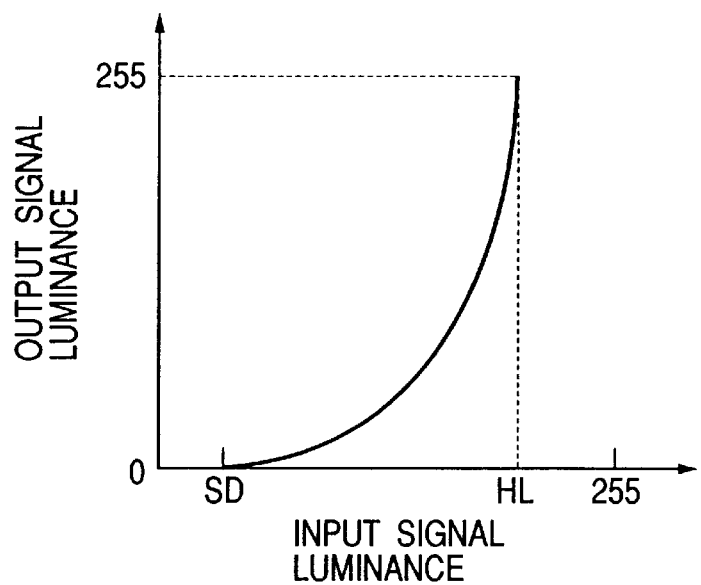
FIG. 13 is diagram of an LUT which is used to correct overexposure.

The fifth embodiment uses fixed type LUTs for images which are judged as standard exposure, overexposure and underexposure (for example, an LUT shown in FIG. 13 for an overexposure image), and creates an LUT suited for each backlight scene image to correct its exposure.

Speaking concretely, the fifth embodiment creates, preliminarily or as occasion demands, a lookup table (LUT) which corresponds an output signal to an input signal so as to locate it on a gradation curve and obtains a corresponding output signal while referring to the LUT using a pixel value of an input image, thereby converting an image signal.

Figure 17:
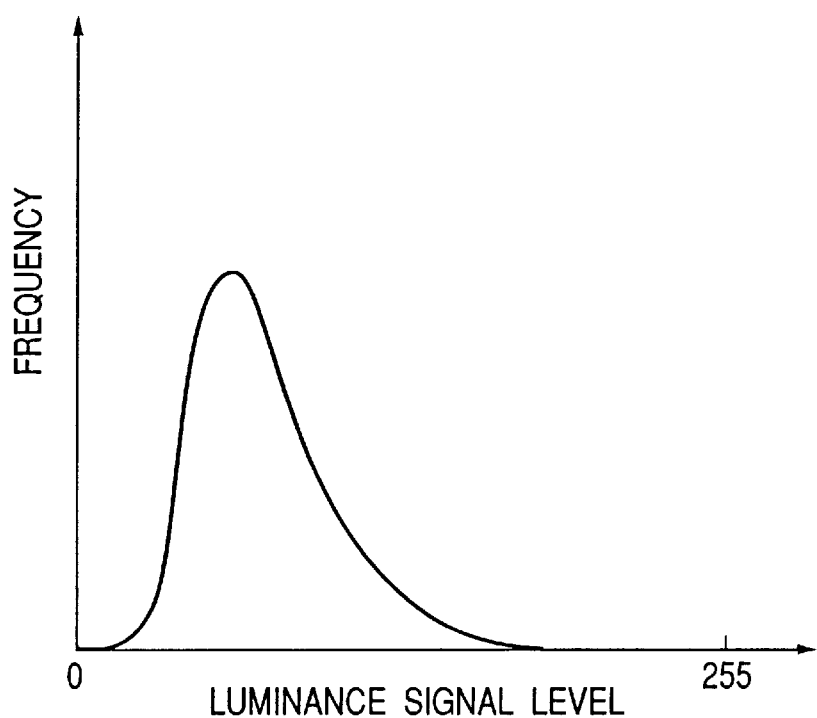
FIG. 17 is a luminance histogram of an underexposed image.

An underexposure image has too dark an intermediate tone as seen from a luminance histogram of an underexposure image shown in FIG. 17. Accordingly, an LUT for underexposure image functions to correct exposure so as to brighten an intermediate tone and enhance gradations of the intermediate tone.

Figure 18:
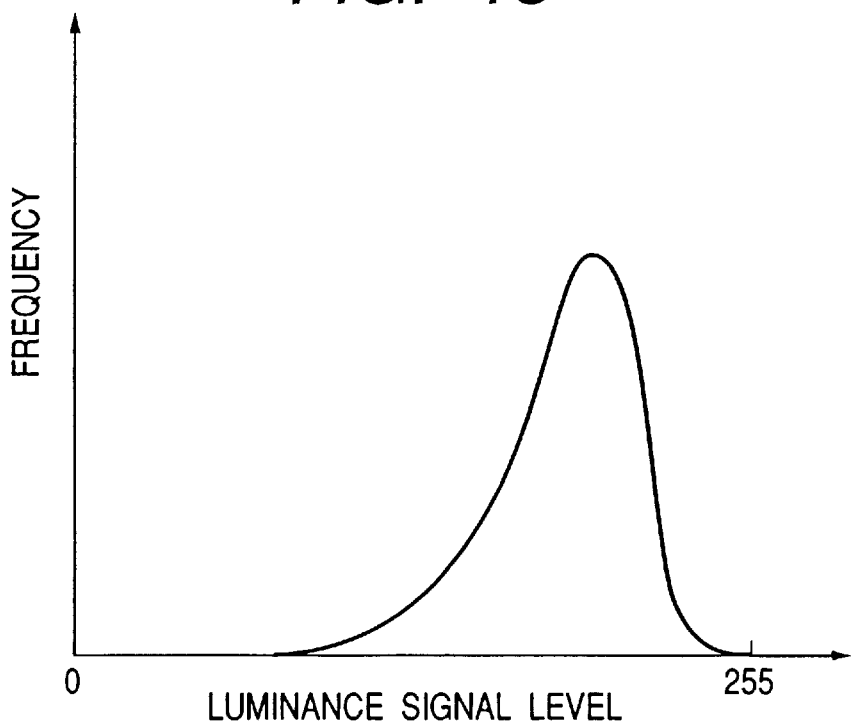
FIG. 18 is a luminance histogram of an overexposed image.

An overexposure image has too bright an intermediate tone as seen from a luminance histogram of an overexposure image shown in FIG. 18. Accordingly, an LUT for overexposure image functions to correct exposure so as to darken an intermediate tone and enhance gradations of the intermediate tone.

Exposure Correction for Backlight Scene and Image in Other Conditions

An image of a backlight scene has a light luminance area which is too bright, a low luminance area which is too dark and an intermediate tone which is scarcely expressed as seen from a luminance histogram of an image of backlight scene shown in FIG. 19.

As an image which is judged as "the other exposure conditions" is, for example, an image of backlight scene on which a background has high luminance and a main object of a person has low luminance.

For the image of backlight scene on which an overexposure backlight area coexists an underexposure main object area, it is desired to correct exposure of the backlight scene so as to brighten the main object area.

Figure 15:
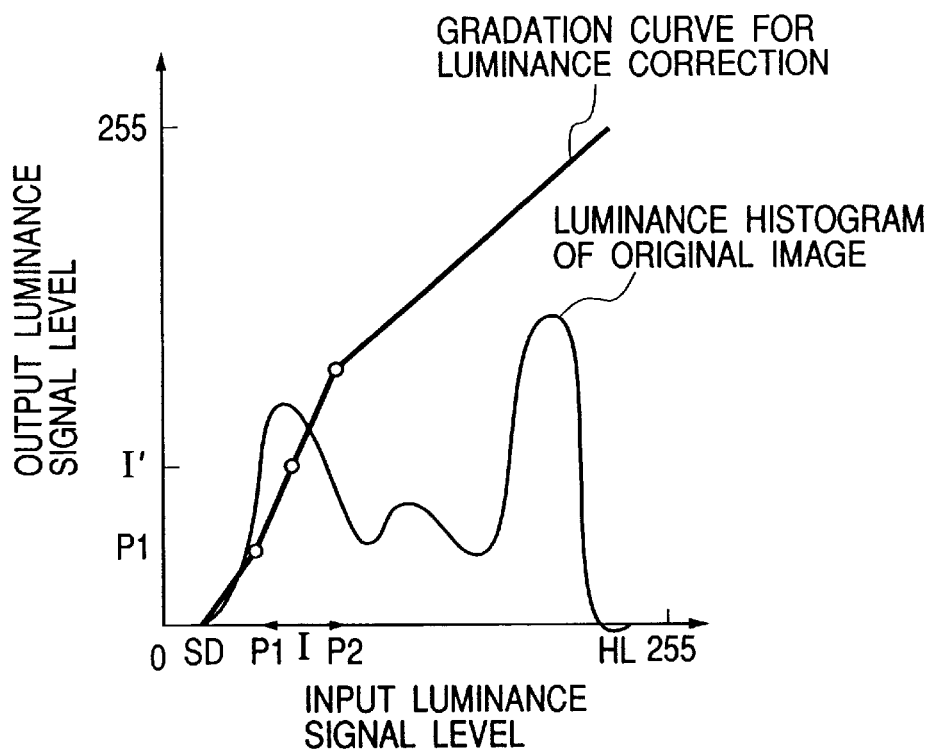
FIG. 15 is a diagram of an LUT which is used to correct other exposure conditions.

The fifth embodiment corrects exposure of an image in "the other conditions" with an LUT which is created on the basis of a luminance histogram of an image as shown in FIG. 15.

The LUT is expressed by formulae shown below using a determined shadow point SD, a highlight point HL, a minimum luminance point P1 representing a minimum luminance value in a peak area on a luminance histogram, a maximum luminance point P2 in the peak area and an average value I1 in the peak area.

An input luminance value and an output luminance value are represented by x and y respectively. Furthermore, the average value I1 is used in place of a true peak value on the luminance histogram on an assumption that a peak of the luminance histogram is located at a center of the determined peak area. When a true peak of the luminance histogram is not located at the center of the peak area and remarkably deviated to an end of the peak area, a favorable result can be obtained by manually inputting luminance values at both ends and the center of the peak area.

$$y=0 (0<=x<SD)$$

$$y-0=(P1-0)/(P1-SD)*(x-SD), \text{ where } (SD<=x<=P1)$$

$$y-P1=A*(I'-P1)/(I1-P1)*(x-P1) (P1<=x<=P2)$$

$$y-y(P2)=(255-y(P2))/(HL-P2)*(x-P2) (P2<=x<=HL)$$

$$y-0(HL<x)$$

By composing an LUT as described above and consecutively calculating x from a lower luminance side, it is possible to obtain a gradation curve which corrects luminance values while placing importance onto an area which has luminance values from P1 to P2.

In the formula mentioned above, I' has a value which is calculated by the following equation:

$$I'=1.5*(I1-SD)$$

And for example, when a luminance histogram of an image which has HL<170 is remarkably deviated on the lower luminance side, the fifth embodiment is capable of multiplying the formula mentioned above by a term of A=1.2 which emphasizes an inclination to shift the histogram on the higher luminance side as a whole.

Furthermore, though an inclination of a straight line in a section of (P1<=x<=P2) is determined by the formula mentioned above, an inclination which is too steep constitutes a cause for increase of a luminance value difference of nearly 1 between pixels before conversion to, for example, 10 after conversion, thereby loosing a smooth variation of a gradation curve. The fifth embodiment limits an inclination of a gradation curve in the section of (P1<=x<=P2) within a range from 0.6 to 2.0 in the fifth embodiment. When a value of y(P2) which is calculated using a determined inclination exceeds 220, it is set at 220 by adjusting the inclination so that section of (P1<=x<=HL) is not too short and the smooth expression on the higher luminance side is not lost.

The fifth embodiment is capable of judging exposure conditions easily.

Furthermore, the fifth embodiment is capable of automatically performing exposure judgement which is optimum for each exposure condition.

Sixth Embodiment

Description will be made of a sixth embodiment of the present invention.

An imaging processing system and a main image processing flow which are used in the sixth embodiment are the substantially the same as those in the first embodiment and will not be described in particular, except for differences which are explained below.

(Peak Detection)

Though the fifth embodiment is configured to detect peaks of the luminance histogram only in areas which have frequencies not lower than the threshold value Th_f, it is considered for checking peak distribution more detailedly to divide the luminance region of 0 to 255 into 16 equal areas, compare heights of these areas and regard an area which has a frequency higher than those of neighboring areas as a peak area.

When a group of luminance values of an accumulated luminance histogram which has a class mark equal to a power of 2 is determined, all luminance histogram areas in luminance value sections partitioned by the group of the luminance values have pixels in the same number, whereby a shorter section has a higher frequency. It is therefore possible to detect peaks of a luminance histogram by comparing lengths of the sections.

(Exposure Judgement)

It is unnecessary for exposure judgement to prepare an over exposure judging module and an under exposure judging module, but it is possible to use a single module to detect both overexposure and underexposure, and effectively utilize resources for exposure judgement with hardware in particular by preparing, for example, only an overexposure module, setting a threshold value for underexposure judgement which is reversed in bit and using an original image which has pixels each reversed in bit as an input image.

Since the threshold value Th_under represents a degree of underexposure of an image at a certain degree, it is possible to adjust a degree of underexposure of an image which is to be judged as an underexposure image by adequately modifying the threshold value. The degree may be adjustable according to a user's manual instruction.

And, at a stage to judge whether or not an image is underexposed, the sixth embodiment is capable of indicating a degree of underexposure by using, in addition to a peak location, an accumulated frequency of a peak area which has the peak, that is, a number of pixels composing a peak located at a lowest luminance in the entire image. A peak width is usable for a similar purpose. Also at a stage to judge whether or not an image is overexposed, the sixth embodiment is capable of indicating a degree of overexposure using the threshold value Th_over, a peak location at a highest luminance value, an accumulated frequency of a peak area which has the peak location, a peak width and the like. Processings such as selection of an LUT out of a plurality of under exposure correcting LUTs and overexposure correcting LUTs may be carried out dependently on a determined degree of underexposure or overexposure.

(Exposure Correction)

Though the fifth embodiment carries out the image correction without considering a γ characteristic of an input/output device, it is desirable to carry out the exposure correction considering the γ characteristic when it is known.

When a highlight point and a shadow point are known, it is allowed to use known values which correspond to the highlight point and the shadow point.

In case of an image which is picked up with a digital camera, a scanner or the like, the sixth embodiment is capable of modifying, for example, a threshold value for judging overexposure or underexposure in conjunction with an image pickup mode.

Furthermore, the sixth embodiment is capable of dividing an original image into adequate regions and performing exposure judgement or exposure correction for the divided regions independently.

In order that an image on which a blue sky occupies most of component pixels is not judged as overexposure image, for example, image signals representing blue, for example, may be processed so as to be weakened at the step to prepare a luminance histogram.

Furthermore, at least one of the R, G and B image signals or a total weight of the R, G and B image signals may be used as an input signal at the step to judge overexposure or underexposure.

Furthermore, in the fifth embodiment the average value of the detected peak areas was used as the peak position of the luminance histogram. However, it is also possible to use a median value or a proper total weight or the like.

Figure 14:
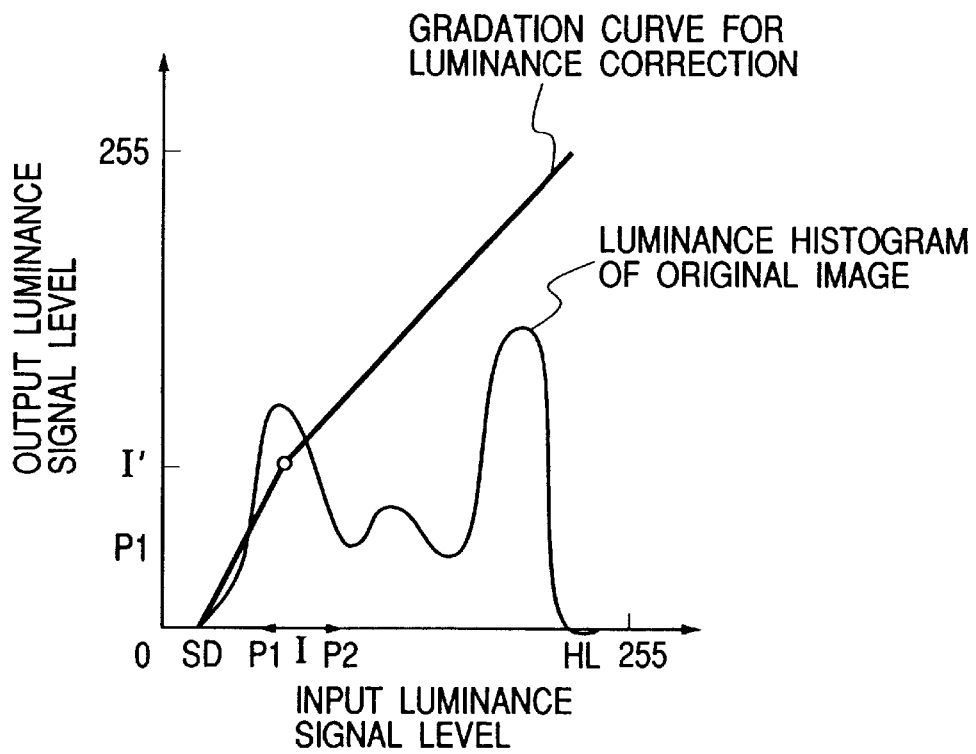
FIG. 14 is a diagram of an LUT (having a folded point) which is used to correct other exposure conditions.

Though a gradation curve which has two folded points like an LUT shown in FIG. 15 is used in the fifth embodiment, a gradation curve which has one folded point like an LUT shown in FIG. 14 may conveniently used to reduce a calculation amount. When a smooth variation having an intermediate tone is required, it is possible to connect gradation curves smoothly using an approximate curve such as a spline curve.

Though fixed LUTs are used to correct standard exposure, underexposure and overexposure images in the fifth embodiment, the LUT which is created on the basis of the HL and SD determined at S33 may be used for exposure correction. Considering the SD and HL, an LUT can be created, for example, by setting a curve so that the SD is converted into a luminance value of 10 and the HL is converted into a luminance value of 245.

Though the fifth embodiment has the mode in which exposure conditions are automatically judged on the basis of the histogram, the image processing system may have a mode in which exposure conditions are judged according to a user's manual instruction.

Embodiment 6

Figure 24:
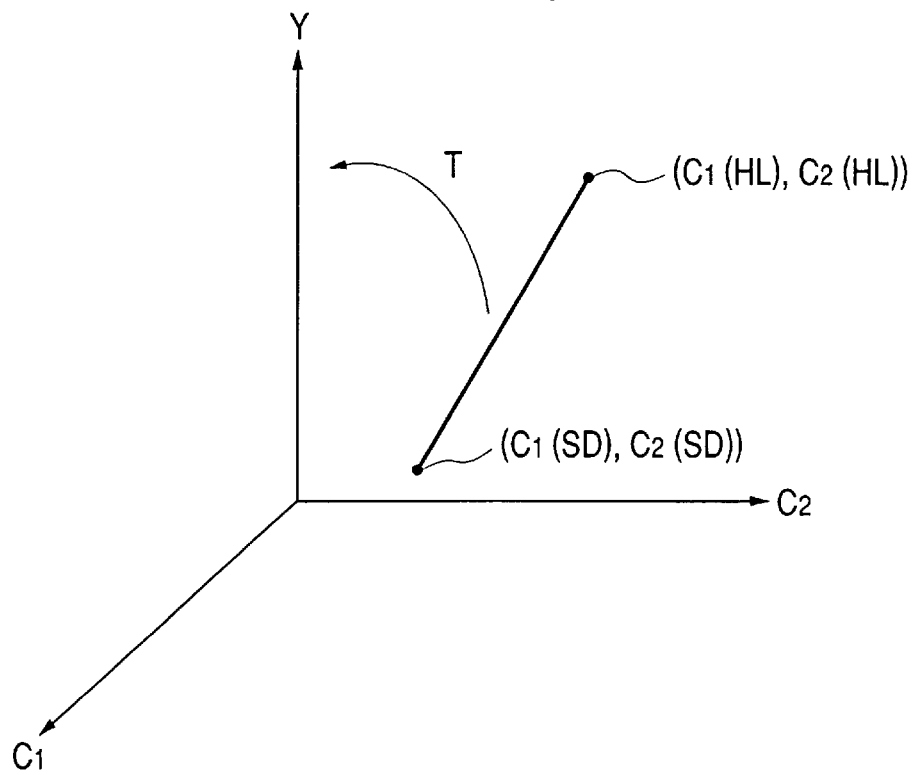
FIG. 24 is a diagram of a $C_1C_2Y$ space which turns a line connecting a highlight point to a shadow point so as to be overlapped with a luminance axis.

To correct color fog, a highlight point ($C_1(HL), C_2(HL)$) and a shadow point ($C_1(SD), C_2(SD)$) are converted into original white and black respectively. A technique to consider a line of color solid which connects a highlight point to a shadow point and convert the line so as to overlap with the luminance axis as shown in FIG. 24 can be mentioned as an example of such a method. This correction makes an image free from the color fog, thereby improving a quality of the image.

The sixth embodiment is capable of adjusting contrast and correcting color fog by creating a histogram of an image to be corrected, determining a highlight point and a shadow point and converting these points as described above.

Figure 25:
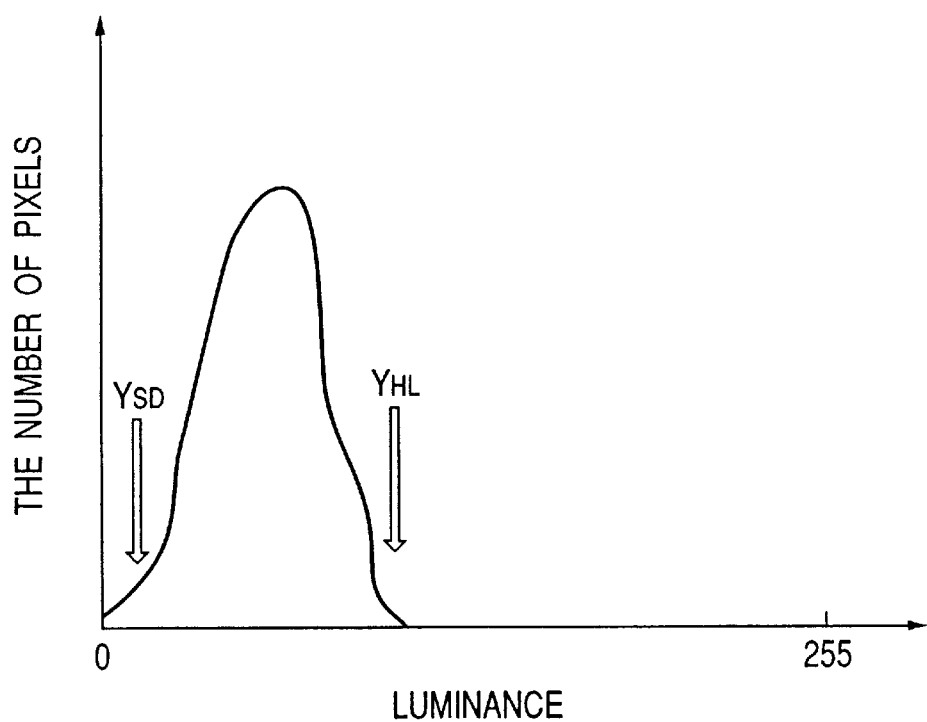
FIG. 25 is a diagram exemplifying a histogram of an image photographed at night.

When a highlight point is set on a luminance histogram such as that shown in FIG. 25 which is often obtained from an image photographed at night, however, luminance is extremely low at a point located with a range of several percents from luminance Y=255. An image which is photographed at night is unnaturally bright when exposure correction is carried out using this point as a highlight point $Y_{HL}$ so as to obtain $Y_{HL}=Y_{255}'$ (wherein $Y_{255}' \cong 255$).

This correction makes CCD noise remarkable in case of an image photographed with a digital camera or may allow block noise to float up noticeably in case of an image contracted with a JPEG or the like.

Then, configuration of the sixth embodiment so as to execute high accurate correction and to obtain favorable output images by properly setting the highlight point will be described below.

Embodiment 6-1

Description will be made of an embodiment 6-1 which is a method to vary a luminance value at a highlight point dependently on luminance at the highlight point after correction.

Figure 27:
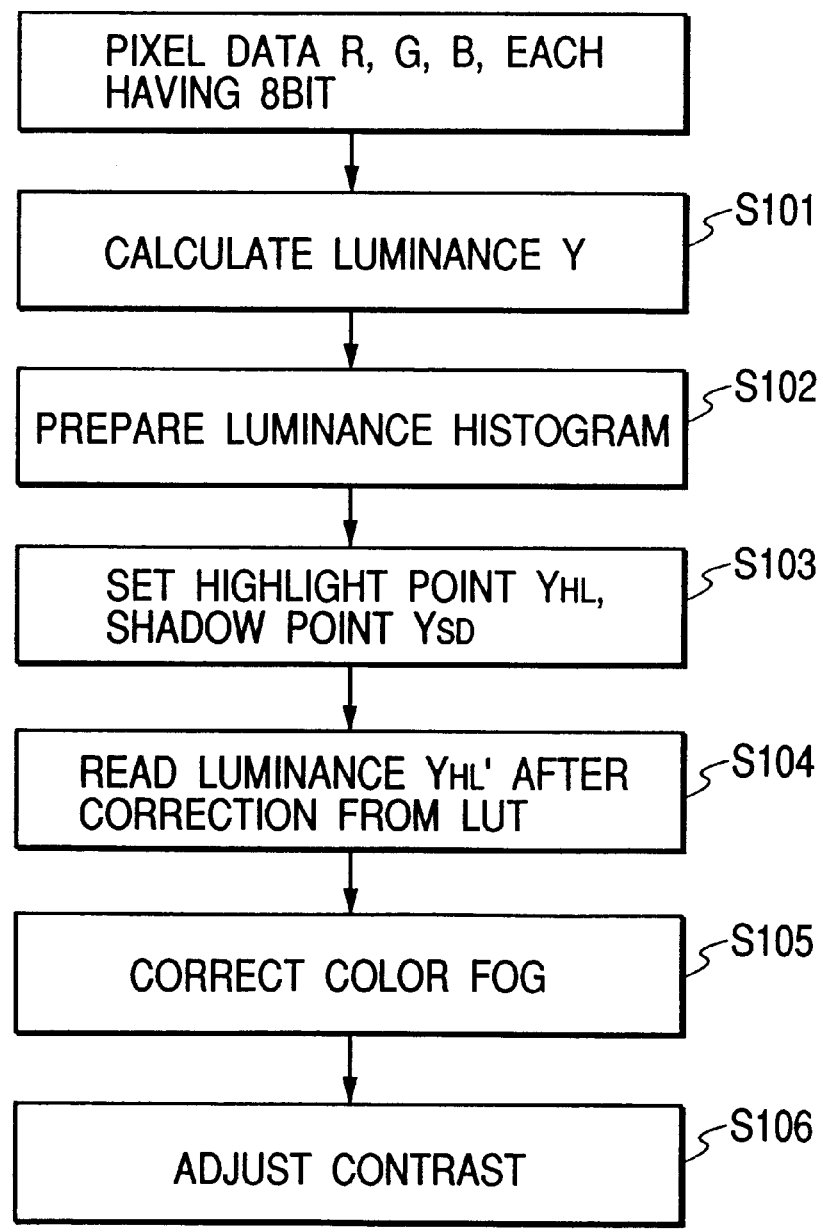
FIG. 27 is a flowchart illustrating processes in an embodiment 6-1.

FIG. 27 illustrates a series of processes for varying a luminance value on a highlight point. First, the image processing system reads image data and creates a luminance histogram. The image data of an image is generally R, G and B signals each having values in 8 bits. From pixels of the read data, luminance Y is calculated by the following equation (S101):

$$Y = 0.3 \times R + 0.59 \times G + 0.11 \times B$$

Figure 28:
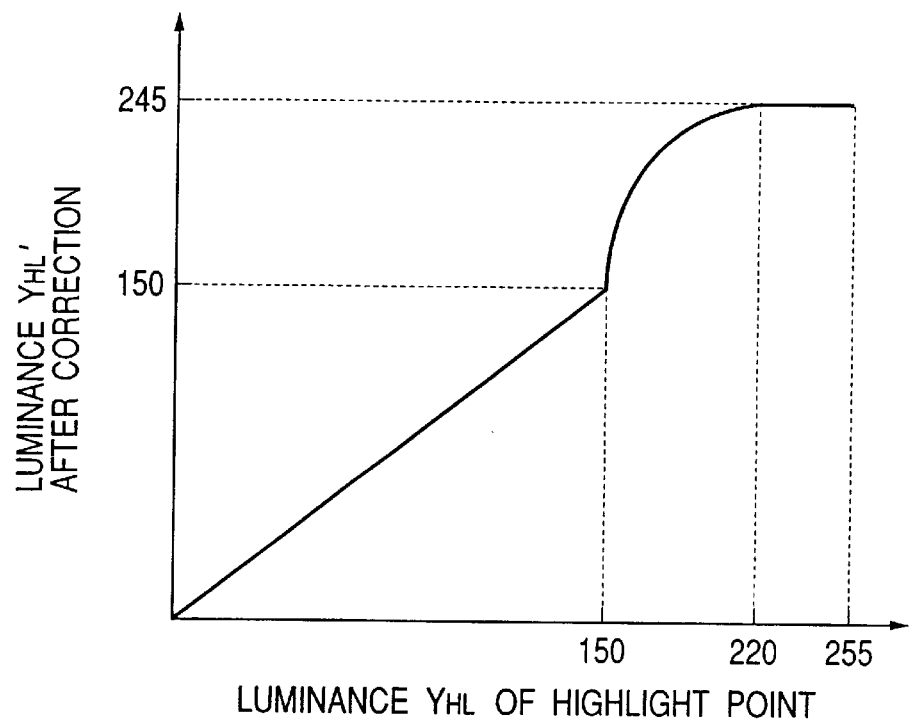
FIG. 28 is a graph illustrating an LUT which is used to determine a luminance value at a highlight point after it is corrected.

The image processing system creates a luminance histogram on the basis of the luminance Y (S102), and locates a highlight point $Y_{HL}$ and a shadow point $Y_{SD}$ at luminance corresponding to several percents from a highest level and at luminance corresponding to several percents from a lowest level respectively (S103). Before color correction to be carried out subsequently, the image processing system does not define the highlight point as $Y_{HL}=Y_{255}'$ (wherein $Y_{255}' \cong 255$), but determines corrected luminance $Y_{HL}'$ dependently on $Y_{HL}$ referring to a lookup table (hereinafter referred to as LUT) (S104). FIG. 28 shows a graph showing an example of LUT, wherein the abscissa represents $Y_{HL}$ and the ordinate designates corrected $Y_{HL}'$. Within an area of the LUT where $0 \leq Y_{HL} \leq 150$, colors are intentionally darkened to regard this area as an image and luminance of the corrected highlight point is not converted. The image processing system is configured not to set the luminance $Y_{HL}'$ of the corrected highlight point at an extremely high level so that a corrected image is not too bright in an area wherein $150 \leq Y_{HL} \leq 220$, and JPEG noise or CCD noise are not remarkable. In an area where $220 \leq Y_{HL}$, the luminance $Y_{HL}'$ of the corrected highlight point is set at the conventional level of 245. A shadow point is conventionally set as $Y_{SD}=Y_0'$ (wherein $Y_0 \cong 0$). After determining the highlight point $Y_{HL}'$ and the shadow point $Y_0'$ as described above, the image processing unit corrects color fog (S105). First, the image processing system calculates average values ($C_1$(HL), $C_2$(HL)) and ($C_1$(SD), $C_2$(SD)) of color difference signals which have luminance values at the determined highlight point and the determined shadow point respectively. Since a line which connects ($C_1$(HL), $C_2$(HL)) to ($C_1$(SD), $C_2$(SD)) should be inclined from the luminance axis when the image is affected by color fog, the image processing system calculates a matrix of rotation T from ($C_1$(HL), $C_2$(HL) and ($C_1$(SD), $C_2$(SD)) so as to overlap the line with the luminance axis. The image processing system is capable of correcting color fog by calculating the matrix of rotation T for all pixels of the original image.

After the correction of color fog, the image processing system corrects underexposure or overexposure (S106) to adjust contrast. It processes all pixels so as to convert the highlight point $Y_{HL}$ and the shadow point $Y_{SD}$ before the conversion into $Y_{HL}'$ and $Y_0'$ respectively. This processing corrects an underexposure image or an overexposure image, thereby adjusting contrast.

By correcting a luminance value according to an LUT at a step to set a highlight point as described above, it is possible to correct colors adequately.

Embodiment 6-2

Description will be made of an Embodiment 6-2 which is a method to correct an image by determining corrected luminance values from LUTs at a step to set a highlight point by comparing a luminance histogram with an average signal value histogram.

When a most portion of an image is occupied by a blue sky, an optimum highlight point cannot always be set from a histogram of luminance signals including the B signal to which a low weight is imparted as in the embodiment 6-1. That is, the histogram of the luminance signals does not allow a bluish cloud to be corrected into a white cloud.

When a person or the like is photographed in a backlight condition, a main object is rather underexpose, thereby making it impossible to obtain favorable gradations. When a highlight point is set for such an image as in the first embodiment, it is fixed nearly to a highest luminance and correction on the basis of this highlight point is almost ineffective.

In the embodiment 6-2, a value of a highlight point to be converted is modified so as to adequately correct the image the most portion of which is occupied by the blue sky or the image of the person photographed in the backlight condition. A method adopted for the embodiment 6-2 not only creates a luminance histogram but also calculates an average value M of R, G and B signals by an equation M=(R+G+B)/3, creates a histogram (hereinafter referred to as an average signal value histogram) on the basis of M and determines a highlight point $M_{HL}$ from this histogram. Thereafter, the image processing system compares a highlight point $Y_{HL}$ determined from the luminance histogram with the highlight point $M_{HL}$ determined from the signal value average histogram and selects $Y_{HL}$ or $M_{HL}$ whichever has a smaller value as a highlight point to be used for correction. When the highlight point is determined from the average signal value histogram, luminance $Y_{HL}$(M) corresponding to the highlight point $M_{HL}$ is set as $Y_{HL}$(M)=$Y_{255}'$ (wherein $Y_{255}' \cong 255$) for contrast adjustment and color fog correction which are to be carried out subsequently. The luminance $Y_{HL}$(M) corresponding to highlight point $M_{HL}$ is determined by preparing 256 tables at a step to accumulate signal values for preparation of the average signal value histogram, storing luminance values into tables corresponding to respective average signal values to increase luminance values and finally dividing a total value of the average signal values by a number of stored signals.

By determining a highlight point as described above, it is possible to set the highlight point, for example, at a cloud portion on an image wherein a cloud is floating in a blue sky, thereby reproducing images such as a blue sky and a white cloud which are close to images memorized by man.

Figure 26:
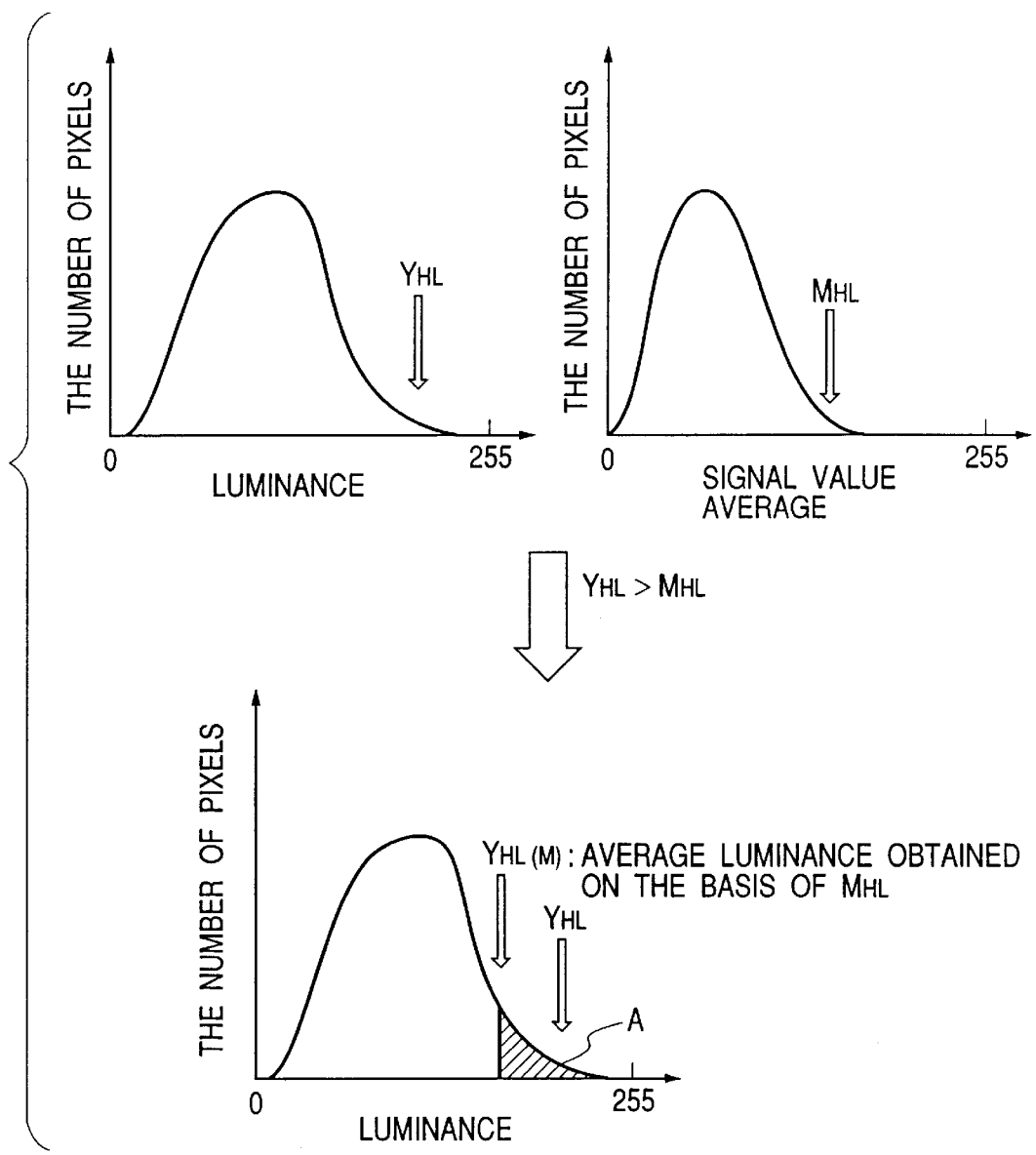
FIG. 26 is a diagram illustrating a method to set a highlight point from a luminance histogram and a signal value average histogram.

However, let us assume a case where the highlight point of the average signal value histogram has a value smaller than the highlight point of the luminance histogram in comparison of these signal histogram and a highlight point is set as shown in FIG. 26. When the color correction described above is made on the basis of this highlight point, colors may be skipped in an area A which is slashed in FIG. 26.

The embodiment 6-2 therefore prepares LUTs which correspond to the highlight point setting methods to obtain a corrected highlight point.

Figure 29:
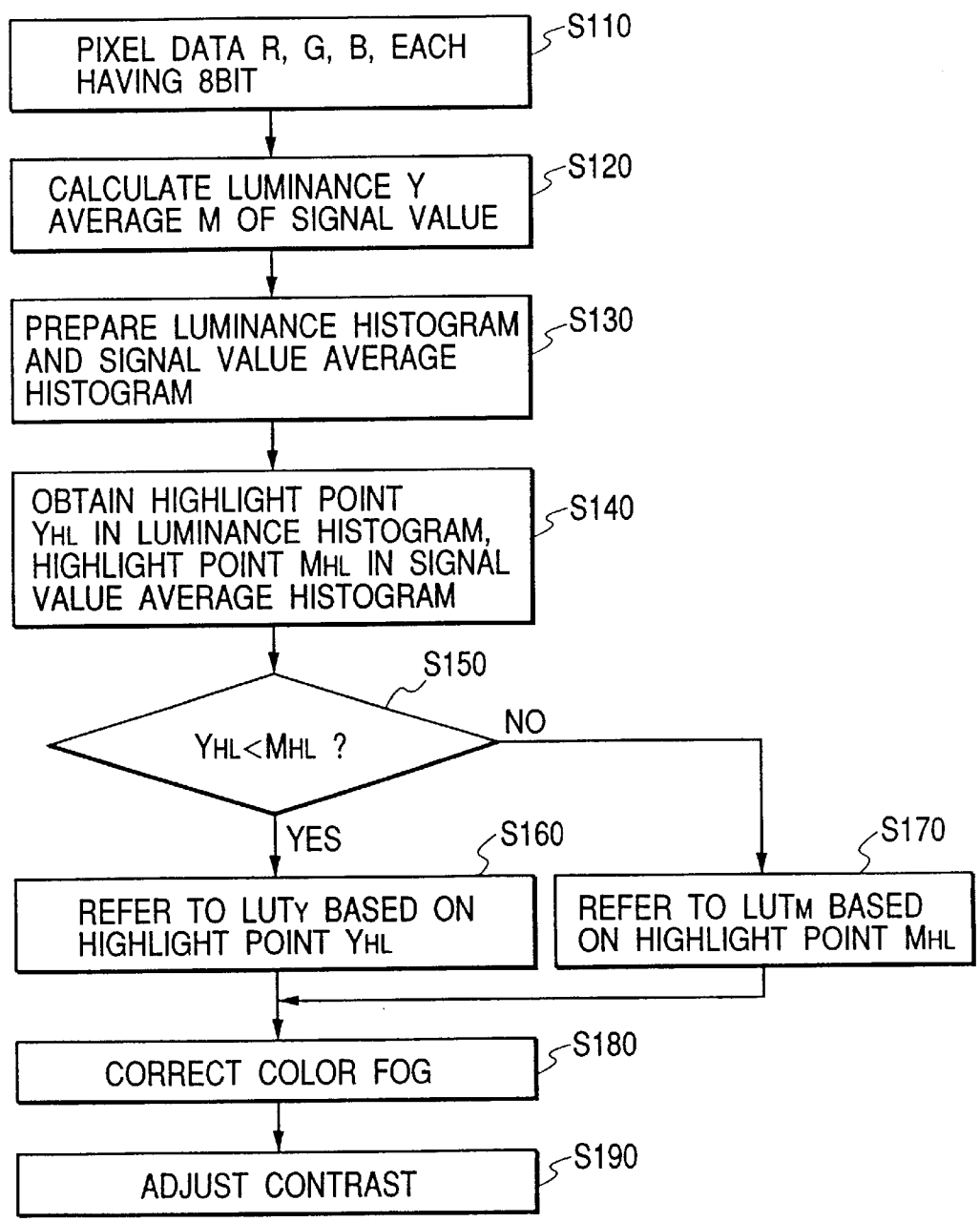
FIG. 29 is a flowchart illustrating processes in an embodiment 6-2.

FIG. 29 shows a flowchart illustrating a processing flow in the embodiment 6-2. First, image data is read as in the first embodiment (S110). Then, luminance Y is determined from the RGB data and an average M of signal values is calculated at the same time (S120). A luminance histogram and a signal value histogram are created from the data (S130). By selecting points located at several percents from tops (255) of the created histograms as highlight points and adopting points located at several percents from bottoms (0) of the created histograms as shadow points, a highlight point $Y_{HL}$ on the luminance histogram and a highlight point $M_{HL}$ on the signal value histogram are determined (S140). These highlight points are compared with each other and one whichever has a smaller value is adopted as a highlight point to be used for color correction (S150).

When $Y_{HL} < M_{HL}$, the highlight point $Y_{HL}$ on the luminance histogram is adopted as the highlight point to be used for color correction. In this case, corrected luminance is determined on the basis of the highlight point $Y_{HL}$ referring to a lookup table (referred to as $LUT_Y$) (S160).

Figure 30:
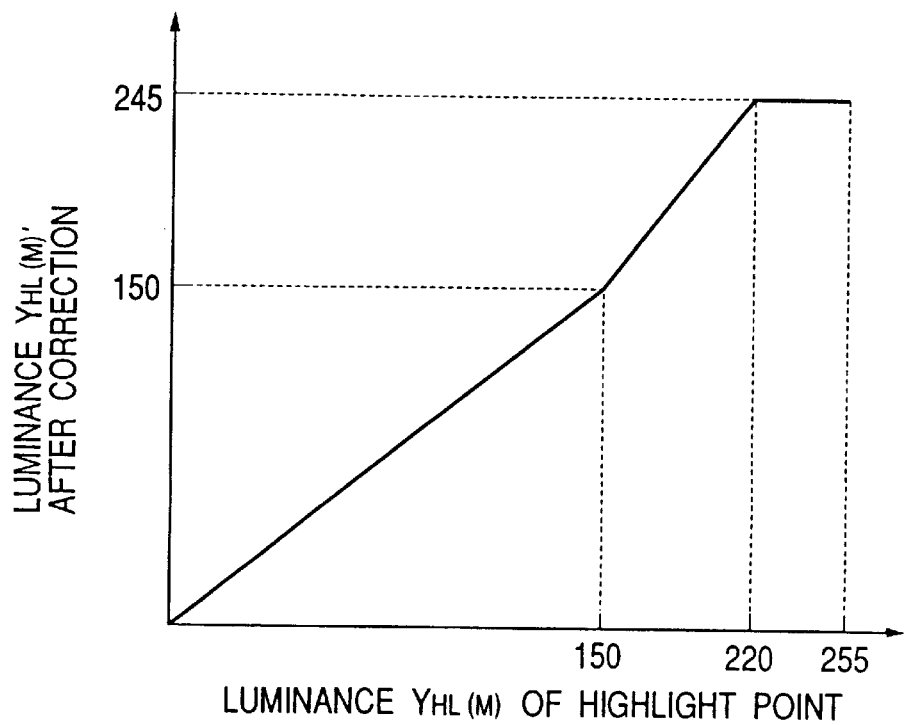
FIG. 30 is a graph illustrating an $LUT_M$ which is used to determine a luminance value at a highlight point determined by averaging signal values after it is corrected.

When $Y_{HL} > M_{HL}$, in contrast, the highlight point $M_{HL}$ on the average signal value high histogram is adopted as the highlight point to be used for color correction. In this case, a corrected luminance value is determined on the basis of the highlight point $M_{HL}$ referring to a lookup table (referred to as $LUT_M$) which is different from that for $Y_{HL}$ (S170). FIG. 30 exemplifies an $LUT_M$ for the highlight point on the average signal value histogram. When the highlight point on the luminance histogram is adopted, converted values are made smaller to prevent the conventional problem of color skip.

Subsequently, the image processing system correct color fog as in the first embodiment on the basis of the highlight point adopted at S150 (S105 in FIG. 27) (S180). Subsequently, the image processing system correct contrast as in the first embodiment (S106 in FIG. 27) on the basis of the highlight point adopted at S150 and the luminance value determined at S160 or S170 (S190).

The embodiment 6-2 which selectively uses the LUTs shown in FIG. 28 and FIG. 30 depending on images is capable of preventing a relatively dark image such as one photographed at night from being unnaturally bright by image correction. Furthermore, images can be corrected optimally while preventing the color skip also by the method which compares the highlight point on the luminance histogram with that of the average signal value histogram for effective reproduction of the image which is mostly occupied by the blue sky and the image photographed in the backlight condition.

The formats of the LUTs used in the embodiment 6-2 which are typically represented by those shown in FIG. 28 and FIG. 30 are only exemplary, and various values may apply to LUTS depending on the kinds of images and degrees of correction.

Other Embodiments

Though the color fog correction is carried out first and then the underexposure or overexposure correction is performed to adjust contrast in the embodiments described above, these corrections may be carried out in an optional order. Furthermore, methods to determine highlight/shadow point and create histograms as well as an algorithm for image correction are not limited to those which are described above, and other various methods are usable for similar purposes. For example, a histogram may be created on the basis of other components which represent brightness.

The embodiments described above may be applied to printer drivers for an ink-jet recording system and electronic photography system as well as drivers of digital cameras.

The image processing system may be configured to correct only objects by the processings described above when an input image contains different kinds of objects such as images, graphics and texts. When the image processing system is configured as described above, it is capable of improving a quality of the images while maintaining image qualities of the graphics and texts.

The present invention has a scope including image processings which are carried out by connecting a computer (CPU or MPU) in an apparatus or system to various devices for operating the devices to obtain the functions of the embodiments described above and supplying software program codes for implementing the functions of the embodiments described above, thereby operating the devices according to a program stored in the computer in the apparatus or system.

In such a case, the software program codes themselves and means to supply the program codes to the computer, for example a memory medium storing the program codes, are included in the scope of the present invention since the program codes themselves have the functions of the embodiments described above.

Usable as a memory medium for storing the program codes is, for example, a floppy disk, a hard disk, an optical disk, a photomagnetic disk, a CD-ROM, a magnetic tape, a non-volatile memory card or a ROM.

Furthermore, it is needless to say that the present invention has a scope including program codes which are supplied to a computer to effectuate the functions of the embodiments described above by executing the supplied program codes with the computer or by cooperating the program codes with an OS (operating system) or another application software operating in the computer.

Furthermore, it is needless to say that the present invention has a scope including program codes which are stored into a memory disposed in a function expansion unit connected to a computer function expansion board or a computer and used to give instructions to perform a part or all of actual processings with a CPU or the like installed in the function expansion board or a function accommodating unit to effectuate the functions of the embodiments described above.

It is needless to say that the scope of the present invention is defined by appended claims in which the present invention is modifiable in many ways.

What is claimed is:

1. An image processing method having a plurality of highlight point detecting methods, comprising the steps of:

selecting a highlight point depending on characteristics of an original image; and setting a color processing condition for the original image depending on the highlight point, wherein the original image includes a plurality of images, and wherein a highlight point detection, said selecting and said setting are executed independently for each of the plurality of images, and wherein a shadow point is detected by a shadow point detecting method which is preliminarily set regardless of the characteristics of the original image by the color processing condition, and wherein said color processing condition is set on the basis of the selected highlight point and the detected shadow point.

2. An image processing method according to claim 1, wherein said plurality of highlight point detecting methods include a highlight point detecting method for a scene of blue sky.

3. An image processing method according to claim 1, further comprising a step of selecting a highlight point according to a user's instruction.

4. An image processing method comprising the steps of:

obtaining a first highlight on the basis of a first histogram on the basis of a luminance signal;

obtaining a second highlight on the basis of a second histogram on the basis of a signal indicating brightness including a blue signal to which a heavy weight is imparted;

comparing said first highlight with said second highlight;

setting a highlight having a smaller value as a highlight point to be used to correct an image; and correcting the image on the basis of said set highlight point.

5. An image processing apparatus having a plurality of highlight point detecting methods, comprising:

selecting means for selecting a highlight point according to characteristics of an original image; and setting means for setting a color processing condition for said original image according to said highlight point, wherein the original image includes a plurality of images, and wherein a highlight point detection, the selecting and the setting are executed independently for each of the plurality of images, and wherein a shadow point is detected by a shadow point detecting method which is preliminarily set regardless of the characteristics of the original image by the color processing condition, and wherein said color processing condition is set on the basis of the selected highlight point and the detected shadow point.

6. A recording medium in which a program is stored, said program comprising the steps of:

preparing a plurality of highlight point detecting methods;

detecting a highlight point according to characteristics of an original image; and setting a color processing condition for the original image according to the highlight point, wherein the original image includes a plurality of images, and wherein a highlight point detection, said selecting and said setting are executed independently for each of the plurality of images, and wherein a shadow point is detected by a shadow point detecting method which is preliminarily set regardless of the characteristics of the original image by the color processing condition, and wherein said color processing condition is set on the basis of the selected highlight point and the detected shadow point.

7. An image processing method according to claim 5, wherein said plurality of highlight point detecting methods include a highlight point detecting method for a scene of blue sky.

8. An image processing method according to claim 5, further comprising a step of selecting a highlight point according to a user's instruction.

9. An image processing method according to claim 6, wherein said plurality of highlight point detecting methods include a highlight point detecting method for a scene of blue sky.

10. An image processing method according to claim 6, further comprising a step of selecting a highlight point according to a user's instruction.

* * * * *